(12) United States Patent
Carney et al.

(10) Patent No.: US 11,053,101 B2
(45) Date of Patent: Jul. 6, 2021

(54) BRIDGE SPAN REPLACEMENT SYSTEM

(71) Applicant: WESTERN MECHANICAL ELECTRICAL MILLWRIGHT SERVICES LTD., Barrie (CA)

(72) Inventors: Mark Carney, Barrie (CA); Rob Doucet, Barrie (CA); Larry Elisses, Barrie (CA)

(73) Assignee: WESTERN MECHANICAL ELECTRICAL MILLWRIGHT SERVICES LTD., Barrie (CA)

( * ) Notice: Subject to any disclaimer, the term of this patent is extended or adjusted under 35 U.S.C. 154(b) by 0 days.

(21) Appl. No.: 16/530,811

(22) Filed: Aug. 2, 2019

(65) Prior Publication Data

US 2019/0352145 A1 Nov. 21, 2019

Related U.S. Application Data

(63) Continuation of application No. 15/979,358, filed on May 14, 2018, now abandoned, which is a
(Continued)

(51) Int. Cl.
*E01D 21/00* (2006.01)
*B66C 17/20* (2006.01)
(Continued)

(52) U.S. Cl.
CPC ................ *B66C 17/20* (2013.01); *B66C 5/04* (2013.01); *B66C 13/04* (2013.01); *B66C 19/002* (2013.01);
(Continued)

(58) Field of Classification Search
CPC ............ E01D 21/06; E01D 22/00; B66C 5/04; B66C 13/04; B66C 17/20; B66C 19/002; B66C 19/005; B66C 19/02
(Continued)

(56) References Cited

U.S. PATENT DOCUMENTS 4,282,978 A   8/1981   Zambon
4,497,153 A   2/1985   Muller
(Continued)

OTHER PUBLICATIONS

CP Rail News, Cordova Bay Station—Canadian Pacific Railway employee magazine article, Replacing Six Bridge Spans Called for Much Ingenuity, http://www.okthepk.ca/dataCprSiding/cprNews/cpNews60/87030113.htm, vol. 17 No. 3, Mar. 1987, Available Online.

*Primary Examiner* — Raymond W Addie
(74) *Attorney, Agent, or Firm* — Millman IP Inc.

(57) ABSTRACT

A vertically-adjustable gantry assembly installation adapted for removal or placement of a train bridge-span of the type which spans and is supported by two piers, comprises a gantry assembly positioned on load-bearing first ground-support locations, the gantry assembly comprising a gantry and a ground-engaging vertical support and lift system, the vertical support and lift system adapted for supporting a combined weight of the gantry and a bridge span in at least one operational vertical position above respective bridge span support-surfaces of the piers including a position corresponding to a disembarking plane in which the leg portions are extended from a stowed position to an extent at least sufficient for the gantry assembly to self-liftoff the pre-installation conveyance system onto the first ground-support locations to effect the gantry assembly installation.

34 Claims, 14 Drawing Sheets

Related U.S. Application Data continuation of application No. 15/238,433, filed on Aug. 16, 2016, now Pat. No. 9,969,601, which is a continuation of application No. 14/883,359, filed on Oct. 14, 2015, now Pat. No. 9,416,505, which is a continuation of application No. 14/169,445, filed on Jan. 31, 2014, now Pat. No. 9,163,367, which is a continuation of application No. 13/787,461, filed on Mar. 6, 2013, now Pat. No. 8,671,490.

(51) Int. Cl.
E01D 21/06 (2006.01)
B66C 19/00 (2006.01)
B66C 19/02 (2006.01)
E01D 22/00 (2006.01)
B66C 5/04 (2006.01)
B66C 13/04 (2006.01)

(52) U.S. Cl.
CPC ............ *B66C 19/005* (2013.01); *B66C 19/02* (2013.01); *E01D 21/06* (2013.01); *E01D 22/00* (2013.01)

(58) Field of Classification Search
USPC ................................................ 14/2.4, 76–78
See application file for complete search history.

(56) References Cited

U.S. PATENT DOCUMENTS

| | | |
|---|---|---|
| 5,511,268 A | 4/1996 | Albus et al. |
| 5,960,502 A | 10/1999 | Sherman et al. |
| 6,721,985 B2 | 4/2004 | McCrary |
| 7,401,371 B2 | 7/2008 | Kornatsky |
| 7,520,014 B2 | 4/2009 | Homsi |
| 8,166,596 B2 | 5/2012 | Kang et al. |
| 8,555,442 B2 | 10/2013 | Liu et al. |
| 8,869,336 B2 | 10/2014 | Meyer |
| 2003/0217420 A1 | 11/2003 | Snead |
| 2009/0230072 A1* | 9/2009 | Wierzba .................. B66C 11/14 212/324 |
| 2009/0282625 A1 | 11/2009 | Homsi |
| 2019/0016568 A1* | 1/2019 | Pan .......................... B66C 1/64 |
| 2020/0122751 A1* | 4/2020 | Markelz .................... B66C 5/02 |

* cited by examiner

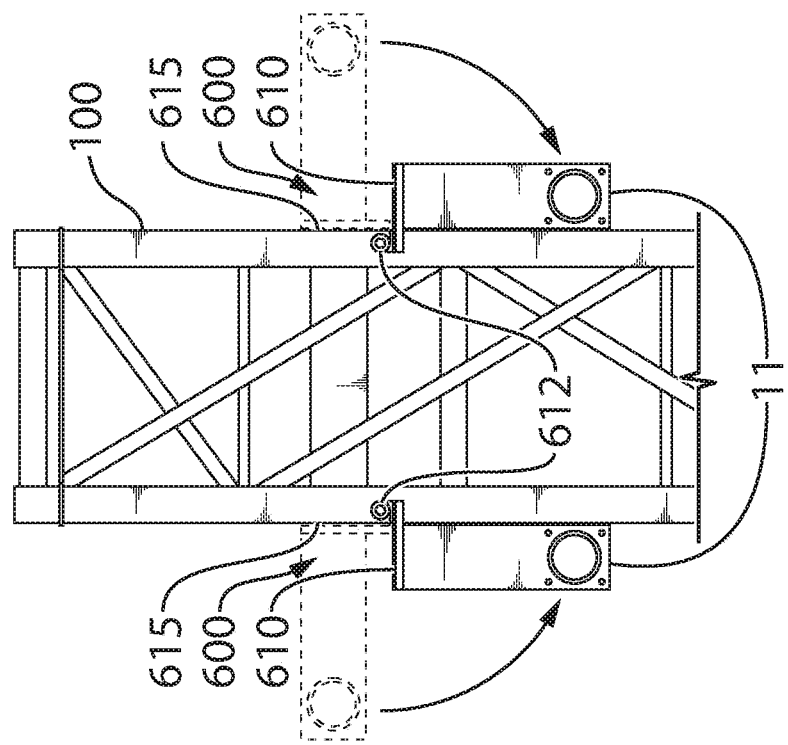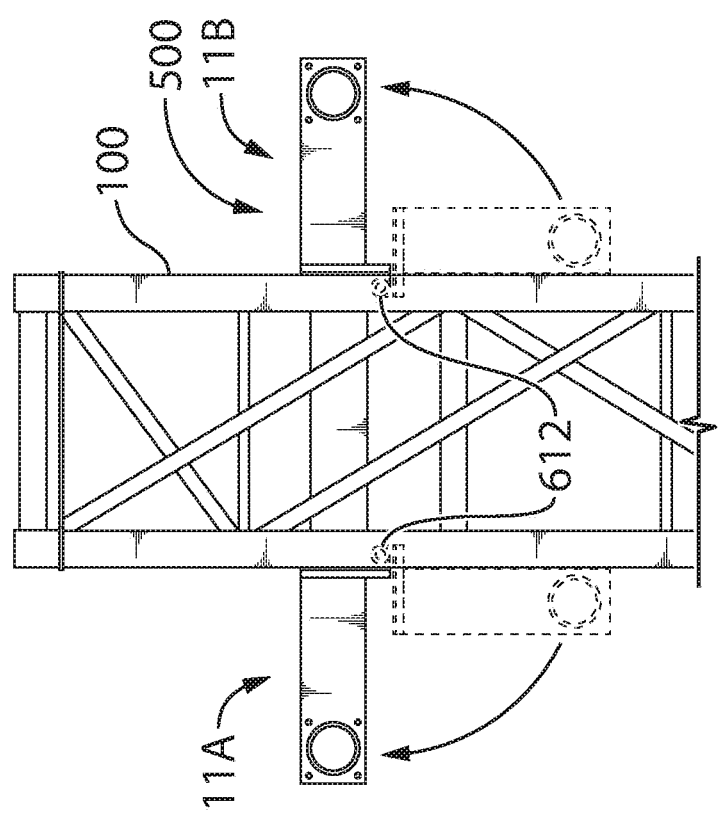
FIG. 4B
FIG. 4A

BRIDGE SPAN REPLACEMENT SYSTEM

CROSS-REFERENCE TO RELATED APPLICATIONS

This application is a continuation of application Ser. No. 15/979,358 filed May 14, 2018, which is a continuation of application Ser. No. 15/238,433; filed on Aug. 16, 2016, now U.S. Pat. No. 9,969,601, issued on May 15, 2018, which is a continuation of application Ser. No. 14/883,359; filed on Oct. 14, 2015, now U.S. Pat. No. 9,416,505, issued on Aug. 16, 2016, which is a continuation of application Ser. No. 14/169,445; filed Jan. 31, 2014, now U.S. Pat. No. 9,163,367, issued Oct. 20, 2015, which is a continuation of application Ser. No. 13/787,461; filed on Mar. 6, 2013, now U.S. Pat. No. 8,671,490, issued Mar. 18, 2014. The disclosures of all of the applications are incorporated herein by reference in their entireties.

FIELD OF THE INVENTION

The present invention relates to a method, system, apparatus and installation for replacing a train bridge span.

BACKGROUND OF THE INVENTION

Trains that travel through urban and rural areas need to cross over roads, hilly terrain and terrain interrupted by other natural vehicle barriers including bodies of water. Train tracks crossing a train bridge are often supported on a replaceable bridge span supported by two piers. Bridge spans can last for decades but increasingly undergo weakening corrosion, develop faults and eventually need to be replaced.

Bridge spans can weigh, on average, as much as 150 tons, and can be as long as 30 meters so that they span two supporting piers. Accordingly, replacing a bridge span can pose considerable challenges.

For example, a train bridge may be located in areas that are difficult to access with cranes and other types of conventional heavy equipment of the type needed to replace a 150 ton bridge span. For example, it is known to use specialized barges and ground equipment to assist in removal and installation of a bridge span from a roadway or waterway beneath the bridge. However, access from beneath a bridge is only possible where the underlying area is accessible by large vehicles or navigable by large floating vessels.

If multiple bridge spans need to be replaced on a particular bridge, a specialized gantry crane may need to be constructed on site in a manner which enables the crane to be sequentially re-positioned on more than one pair of adjacent piers.

Furthermore, a site of span replacement may be an environmentally sensitive area that would be damaged by bringing in conventional or specialized equipment.

Furthermore, replacing a bridge span may interrupt train traffic for a considerable period of time. The down-time costs railway companies and the industries they service large sums in lost time and/or revenues.

Accordingly, there is a need for a rapid, agile, broadly usable and environmentally safe form of train bridge span replacement that accommodates span removal and installation at single and multiple bridge-span replacement sites.

SUMMARY OF THE INVENTION

The invention will now be described in several aspects including a gantry assembly, a system in which the gantry assembly is a component, in which different conveyance systems are used in cooperation with the gantry assembly, a gantry assembly installation in which the gantry assembly is installed at a particular location and in a particular manner, a method for installing a gantry assembly at a bridge span replacement site, a method of removing an existing bridge span and a method of installing a new bridge span.

According to one aspect, the invention is directed to a vertically-adjustable gantry assembly installation as defined below:

A vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to support a gantry conveyance system;

the vertical support and lift system adapted for supporting the gantry in at least one operational vertical position above respective bridge span support-surfaces of the piers including a position corresponding to a disembarking plane in which the leg portions are extended from a stowed position to an extent sufficient for the gantry assembly to self-liftoff the pre-installation conveyance system onto the first ground-support locations to effect the gantry assembly installation.

Optionally, the vertical support and lift system is operatively associated with a power system and a control system, for example an integrated or separate hydraulic power unit which is controlled by a control system to extend the legs from a stowed position in order to effect a gantry installation.

According to another embodiment the invention is directed to a vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to operatively associated with a gantry conveyance system adapted to support the weight of the bridge span and a ground conveyance system;

the vertical support and lift system including leg portions having ground engaging portions and a gantry connection portion including an outrigger portion, the vertical support and lift system adapted for supporting a combined weight of the gantry and a bridge span in at least one operational vertical position above respective bridge span support-surfaces of the piers including a position corresponding to a horizontal transport plane in which the bridge span is conveyed by the gantry conveyance system along at least a portion of gantry.

The gantry assembly installation is adapted to transfer a load corresponding to the weight of the bridge span from the gantry conveyance system to the ground conveyance system.

The gantry assembly installation is adapted to transfer a load corresponding to the weight of the bridge span from the ground conveyance system to the gantry conveyance system.

The load corresponding to the weight of the bridge is optionally transferred in stages, for example, a load corresponding to a forward end of the bridge span may be transferred first followed by a load corresponding to a rearward end of the bridge span.

In a related aspect, another embodiment:

A vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to operatively associated with a gantry conveyance system and a ground conveyance system;

the vertical support and lift system adapted for supporting a combined weight of the gantry and a bridge span in at least one operational vertical position above respective bridge span support-surfaces of the piers including a position corresponding to a disembarking plane in which the gantry assembly is adapted to self-liftoff the pre-installation conveyance system onto the first ground-support locations to effect the gantry assembly installation, the vertical support and lift system including leg portions, the leg portions including ground engaging portions, the ground engaging portions including overhang portions of a ground support structure, the leg portions adapted to be used with or operatively associated with an alignment system, the alignment system optionally including an abutment member (e.g. on the ground engaging portions or overhang portions of the ground support structure) for aligning the overhang portions with ground-supported portions of the ground support structure.

In a related aspect, the invention is also directed to a vertically-adjustable gantry assembly installation adapted for removal or placement of a train bridge-span of the type which spans and is supported by two piers, comprising:

A gantry assembly securely positioned on load-bearing first ground-support locations, the gantry assembly comprising a gantry and a ground-engaging vertical support and lift system, the vertical support and lift system operatively associated with a power system and a control system, the gantry assembly adapted to be operatively associated with a gantry conveyance system, the gantry assembly adapted to be transported in a horizontal position to a site for placement or removal of a bridge span by a pre-installation conveyance system (27) including at least one rail car;

the vertical support and lift system adapted for supporting a combined weight of the gantry and a bridge span in operational vertical positions above respective bridge span support-surfaces of the piers including a position corresponding to at least one horizontal transport plane in which the bridge span is conveyable relative to the gantry by the gantry conveyance system and a disembarking plane in which the leg portions are extended by the power system from a stowed position to an extent at least sufficient for the gantry assembly to self-liftoff the pre-installation conveyance system onto the first ground-support locations to effect the gantry assembly installation.

Additional embodiments of the various embodiments of a gantry assembly installation, according to one aspect of the invention, as defined above, will now be summarized.

Optionally, the vertical support and lift system includes:

a load bearing first vertical support assembly operatively connected to the gantry proximal to a first end thereof; and a load-bearing second vertical support assembly operatively connected to the gantry proximal to a second end thereof.

Optionally, each vertical support assembly including at least one leg portion having a ground engaging portion and a gantry connection portion for connecting the leg portions to the gantry, the vertical support and lift system including or adapted to be operatively associated with a power system and a control system to vary the linear vertical distance between the ground engaging portion of a leg portion and the gantry to control the vertical height of the gantry.

Optionally, the lift system is hydraulically powered. Optionally, the power system includes a hydraulic power unit supported by the gantry assembly.

Optionally, the gantry conveyance system is operatively connected to a bridge span support system, optionally in the form of a bridge span connection system for suspending the bridge span from the gantry conveyance system, the gantry conveyance system and a bridge span connection system configured to provide at least two conveyable, separately locatable, suspension means for suspending the bridge span beneath the gantry.

The suspension means are optionally two separately locatable vehicles configured to travel along a track system supported by the gantry assembly. Optionally, the vehicle(s) is/are adapted to be hydraulically powered. Optionally, the power system powers the vertical support and lift system and the vehicle(s).

Alternatively, the suspension means may vehicles operatively associated with winches.

Optionally, the vehicle(s) is/are adapted to independently support the weight of a bridge span and configured for conveying a bridge span in a substantially horizontal plane along at least a portion of the length of the gantry, movement of bridge span relative to the gantry via the gantry conveyance system defining at least a first portion of the horizontal transport plane, the gantry conveyance system adapted to be operatively associated with a bridge span connection system configured for suspending the bridge span from the gantry conveyance system, beneath the gantry, for conveyance in the horizontal transport plane.

Optionally, the gantry assembly installation is operatively associated with a load-bearing ground conveyance system positioned at load bearing second ground-support locations, the ground conveyance system including a support portion for supporting a load comprising the weight of a bridge span, the ground conveyance system adapted to be transported along a path beginning at the end of the bridge span and extending away from the bridge span.

Optionally, the gantry assembly and/or the gantry conveyance system defining vehicle position limits that delimit a maximum horizontal travel distance that the at least one vehicle can travel in the horizontal transport plane when supporting a load comprising at least a portion of the weight of the bridge span, a vehicle position limit and/or the path accommodating conveyance of the bridge through at least a threshold horizontal conveyance distance required for transferring load support from the gantry conveyance system to the ground conveyance system and/or from the ground conveyance system to the gantry conveyance system.

Optionally, the gantry assembly and/or the gantry conveyance system at least partially define bridge span position limits that delimit a minimum horizontal transport distance over which the bridge span can be conveyed with at least partial load support from the gantry conveyance system, the minimum horizontal transport distance extending beyond the first ground locations.

Optionally, the gantry connection portion includes an outrigger portion configured to laterally distance the at least one leg portion of at least one vertical support assembly from lateral perimeters of the gantry, whereby the outrigger portion is adapted to accommodate passage of a bridge span, having a footprint wider than the gantry, between the leg portions of at least one vertical support assembly to accommodate transfer of load support from the gantry conveyance system to the ground conveyance system and/or from the ground conveyance system to the gantry conveyance system.

Optionally, the at least one rail car of the pre-installation conveyance system define a conveyance system footprint area including lateral perimeters, the gantry optionally configured to have a gantry footprint area having lateral perimeters which fit within the lateral perimeters of the pre-installation conveyance system, the outrigger portion adapted to position leg portions of at least one vertical support assembly beyond the lateral perimeters of the footprint area of the pre-installation conveyance system, to clear the lateral perimeters of the pre-installation conveyance system, when the gantry legs are lowered to effect a gantry installation.

Optionally, the leg portions are connected to the outrigger portions of the gantry connection portion (e.g. extend therefrom) and the outrigger portion together with the leg portions of at least vertical support assembly are rotationally mounted with respect to positionally-fixed portions of the gantry connection portion, for movement about a vertical axis perpendicular to the longitudinal axis of the gantry between a stowed position in which the outrigger portion and leg portion are rotated towards the gantry and a laterally extended installation position, the outrigger portion and leg portions fastened to the positionally-fixed portion to prevent rotation and accommodate full load support in the installation position.

Optionally, the outrigger portion of the gantry connection portion is hingedly-mounted to a positionally-fixed portion of the gantry connection portion.

The gantry assembly defines a footprint on the pre-installation conveyance system. Optionally, the lateral perimeters of the gantry assembly footprint lie within the lateral perimeters of the footprint area of the pre-installation conveyance system when the gantry assembly in supported on the pre-installation conveyance system in a stowed position.

Optionally, the lateral perimeters of the gantry assembly footprint, when in the stowed position, falls within existing railway clearances for the delivering the gantry assembly to or from a site of placement or removal of a bridge span.

Optionally, the overall footprint of the gantry assembly supported on the pre-installation conveyance system is accommodated by existing railway clearances by pre-defined lateral tolerances.

Optionally, the overall pre-installation conveyance envelope of the gantry assembly supported on the pre-installation conveyance system is accommodated by existing railway clearances by pre-defined lateral and vertical tolerances. Optionally, the post-installation conveyance envelope is similarly accommodated.

Optionally, each vertical support assembly comprises an outrigger portion and two leg portions, the leg portions adapted to be contracted by the vertical support and lift system to occupy a compact configuration which provides suitable ground clearance in the stowed position.

Optionally, the first ground-support locations are ground locations adapted for load support.

Optionally, the first ground locations include a pre-installed ground support structure.

Optionally, the ground support structure includes ground-supported portions and overhang portions which have no direct ground support.

Optionally, the ground support structure is a ground engaging load bearing support beam installed over load supporting ground material at ground locations corresponding to planned ground positions of ground engaging portion(s) of the first vertical support assembly and/or the second vertical support assembly. Optionally, the support beams are steel tie beams at least partially supported on ground material under portions of a train track leading respectively to and from an existing bridge span.

Optionally, these support beams are positioned to have a top-surface height which provides load-bearing support to the under-surface of train-track rails proximal to the first ground locations when the tie beams are supported at respective ground locations formerly occupied by railway ties.

Optionally, the ground engaging portions of the leg portion(s) of the first vertical support assembly and the second vertical support assembly are adapted to be securely fastened to the support beam.

Optionally, the support beam has connection portions for connecting to the ground engaging portions (e.g. foot portions) of the leg portions and the foot portions have mating connection portions.

Optionally, the tie beam may consist of a pre-installed middle section and two end sections which are secured to the middle section when the gantry assembly is installed at the first ground support locations.

Optionally, the ground conveyance system comprises at least one rail car supported on load-bearing second ground locations in the vicinity of the bridge-span support surface of a pier, the ground conveyance system adapted to travel on a path defined by rails of a track used to transport the gantry assembly or a bridge span to or from a gantry assembly installation site.

The path preferably extends a vehicle position limit on at least one side of the gantry by a distance at least sufficient to transfer load support from the gantry conveyance system to the ground conveyance system, optionally by a distance sufficient to convey the bridge span to an alternate train track.

Optionally, the horizontal transport plane is vertically circumscribed by an upper vertical clearance limit defined by a lower edge of the gantry and a lower vertical clearance limit defined by a bridge span support surface of the ground conveyance system.

Optionally, the bridge span connection system includes a plurality of straps sized to suspend the bridge span beneath upper vertical clearance limit.

Optionally, the control system is operable to raise the gantry into a vertical position in which the lower vertical clearance limit is above and clears the support portion of the first ground conveyance system, the control system operable to lower the bridge span onto the support surface of the ground conveyance system.

Optionally, the pre-installation conveyance system comprises a support portion adapted to support the gantry assembly. Optionally, the gantry assembly has a surface configuration adapted to be supported in a substantially horizontal position on the support portion. Optionally, the gantry has a flat bottom and the pre-installation conveyance system has complimentary support surfaces e.g. flat support bed, optionally outfitted with support portions that enable the gantry to swing as necessary when the train track curves e.g. a bolster.

Optionally, the vertical support and lift system is adapted to be used with or directly operatively associated with (e.g. secured to) to an overhang ground-support system for example overhang portions of a ground support structure. The term "ground support structure" is used to any structure used to introduce a load-bearing support feature and/or a stability feature e.g. in order to enhance or form the first, second or third ground locations. The ground support structure is optionally operatively associated with an alignment system, for example a vertical and/or lateral alignment system, optionally including an alignment means for aligning the ground engaging portion of the gantry legs with overhang portions of the overhang ground support system, for example for aligning connection portions that enable the ground engaging portions to be connected to the overhang portions or the overhang portions to be connected to ground support portions of the overhang ground support system. The alignment means may be a vertical alignment means, for example a projecting abutment portion or other stop means to gauge or define stop positions when lowering the leg portions from off the pre-installation conveyance system, for example, so that the overhang portions of the overhang ground support system are urged to be arrested into alignment with the ground support portions of the overhang ground support system. Thus, the overhang ground support system defines or provides first ground support locations for supporting the ground engaging vertical support and lift system. Optionally, the ground engaging portions of the leg portions are pre-attached to and include the overhang portions of the ground support structure. In a methodological aspect the method of the invention optionally includes, preliminary to effecting a gantry installation, a preliminary ground-support preparation step optionally including the step of installing the ground support portions of an overhang ground support system e.g. in the form a ground support structure like a beam. Optionally, the alignment system includes accurate positioning the rail carts on the train track (x axis), accurate positioning of the gantry assembly on the rail carts (y axis) along with lateral play in mating portions of the gantry leg and the ground engaging (e.g. shoe or foot) portion (the foot portion is pinned to the leg portion in a manner in which provides play in the Y axis) and controlled finally lowering of the gantry legs (z axis) aided by a vertical alignment system in the form of an vertical alignment means e.g. a laterally projecting abutment portion.

Additional features of the gantry assembly installation are described below with reference to other aspects of the invention.

For example, the gantry conveyance system may be associated with a spreader structure adapted for supporting the bridge span from both sides of the gantry.

Optionally, the gantry conveyance system includes a track system which includes a track positioned on top or beneath the gantry.

Optionally, the gantry assembly comprises right and left portions spaced to provide clearance for suspension members belonging to a suspension system, for example a bridge span connection system in the form of straps operatively connected to the undersurface of a vehicle or trolley. The term "member" broadly refers to a part or portion, for example of a structure or system. The suspension members are optionally be cables which are adapted for use at a fixed operational length or alternatively are operatively associated with a winch or a strand jack.

Similarly, embodiments of the gantry assembly installation described above may apply to other aspects of the invention, even though they are not repeated below.

According to another aspect the invention is directed to a gantry assembly for removal or placement of a train bridge-span of the type which spans and is supported by two piers, comprising:

A gantry;

A ground-engaging vertical support and lift system;

the gantry assembly configured to be transported in a horizontal position to a site for placement or removal of a bridge span by a pre-installation conveyance system (27) including at least one rail car;

the vertical support and lift system including:

a load bearing first vertical support assembly operatively connected to the gantry proximal to a first end thereof; and a load-bearing second vertical support assembly operatively connected to the gantry proximal to a second end thereof, the gantry assembly adapted to support a gantry assembly conveyance system, the gantry conveyance system adapted to support the weight of a bridge span and configured for conveying a bridge span in a horizontal transport plane along at least a portion of the length of the gantry, the gantry conveyance system adapted to be operatively associated with a bridge span support system (e.g. a suspension system) for supporting the bridge span from at least two positions on the bridge span proximal to the ends of the bridge span;

each vertical support assembly including at least one leg portion having a ground engaging portion and a gantry connection portion for connecting the leg portions to the gantry, the gantry connection portion including an outrigger portion, the vertical support and lift system including or adapted to be operatively associated with a power system and a control system to vary the linear vertical distance between the ground engaging portion of a leg portion and the gantry to control the vertical height of the gantry, the vertical support and lift system adapted for supporting a combined weight of the gantry and a bridge span in an operational vertical positions above the respective bridge span support-surfaces of the piers including at least one position corresponding to the horizontal transport plane.

Optionally, the bridge span support system is a bridge span connection system, the bridge span connection system optionally comprising straps.

Optionally, the gantry conveyance system includes a track system operatively connected to the gantry assembly;

the gantry assembly and/or the gantry conveyance system defining horizontal bridge span conveyance limits that delimit a maximum horizontal travel distance over which the bridge span can be conveyed by the gantry conveyance system alone in the horizontal transport plane;

the gantry conveyance system configured to cooperate with a load-bearing ground conveyance system including a support portion for supporting a load comprising the weight of a bridge span, the ground conveyance system adapted to be transported on a path extending away from an end of a bridge span, a vehicle position limit and/or the path accommodating conveyance of the bridge span through at least a threshold horizontal conveyance distance required for transferring load support from the gantry conveyance system to the ground conveyance system and/or from the ground conveyance system to the gantry conveyance system.

Optionally, the gantry assembly and/or the gantry conveyance system at least partially define bridge span position limits that delimit a minimum horizontal transport distance over which the bridge span can be conveyed with at least partial load support from the gantry conveyance system, the minimum horizontal transport distance extending beyond the first ground locations.

Optionally, as described above, the gantry conveyance system and bridge span connection system are configured to provide at least two conveyable, separately locatable, suspension means for suspending the bridge span beneath the gantry.

Optionally, as described above, the at least one rail car of the pre-installation conveyance system defines a conveyance system footprint area including lateral perimeters, the outrigger portion adapted to position leg portions of at least one vertical support assembly beyond the lateral perimeters of the footprint area of the pre-installation conveyance system, to clear the lateral perimeters of the pre-installation conveyance system, when the gantry legs are lowered to effect a gantry installation.

Optionally, as described above, the outrigger portion and leg portions of at least one vertical support assembly are rotationally mounted, for example, with respect to positionally-fixed portions of the gantry connection portion, for movement about a vertical axis perpendicular to the longitudinal axis of the gantry between a stowed position and a laterally extended installation position. Optionally, each vertical support assembly comprises an outrigger portion and two leg portions, the leg portions adapted to be contracted by the vertical support and lift system to occupy a compact configuration which provides suitable ground clearance in the stowed position.

Optionally, as described above, the first ground-support locations are ground locations adapted for load support, for example, by installing a ground engaging load bearing support beam (9) installed over load supporting ground material at ground locations corresponding to planned ground positions of ground engaging portion(s) of the first vertical support assembly and/or the second vertical support assembly.

Optionally, as described above, at least one vertical support position correspond to a disembarking plane in which the leg portions are extendable e.g. by a power system, from a stowed position on the pre-installation conveyance system to an extent at least sufficient for the gantry assembly to self-liftoff the pre-installation conveyance system onto the first ground-support locations to effect a gantry installation.

Optionally, as described above, the outrigger portion is configured to laterally distance at least one leg portion (preferably both) of at least one vertical support assembly from lateral perimeters of the gantry, whereby the outrigger portion is adapted to accommodate passage of a bridge span, having a footprint wider than the gantry, between the leg portions of at least one vertical support assembly to accommodate transfer of load support from the gantry conveyance system to the ground conveyance system and/or from the ground conveyance system to the gantry conveyance system.

Optionally, as described above, the gantry is configured to have a gantry footprint area having lateral perimeters which fit within the lateral perimeters of the pre-installation conveyance system, the outrigger portion adapted to position leg portions of at least one vertical support assembly beyond the lateral perimeters of the footprint area of the pre-installation conveyance system, to clear the lateral perimeters of the pre-installation conveyance system, when the gantry legs are lowered to effect a gantry installation.

Optionally, as described above, the first ground locations are ground locations adapted for load support, for example, by installing a ground engaging load bearing support beam positioned over load supporting ground material at ground locations corresponding to planned ground positions of ground engaging portion(s) of the first vertical support assembly and/or the second vertical support assembly, the ground engaging portions of the leg portions adapted to be secured to the load bearing support beam.

Optionally, as described above, the gantry conveyance system comprises two separately locatable vehicles powered by a hydraulic vehicle power system, the vehicles operatively connected to a vehicle control system for controlling a respective position of the vehicle on the track system including forward and rearward movement. Optionally, the control system for controlling the vertical support and lift system is a remote-control system. Optionally, the vehicle control system is a remote-control system. Optionally, the two remote-control systems are integrated into a single control unit adapted to be controlled by a single operator.

Optionally, the vehicles are operatively connected to a spreader structure, the spreader structure oriented transversely with respect to the longitudinal axis of the gantry for distancing two points of suspension of the bridge span from the center of gravity of a vehicle. Optionally, the spreader structure is configured to suspend the bridge span from two sides of the gantry.

Optionally, the bridge span connection system comprises straps (e.g. webbing made of synthetic fibers, or steel cable, with a breaking strength adapted to support a portion of the weight of the bridge span), each end of the spreader structure optionally displaced sufficiently from a center of gravity of the vehicle to define a line of sight between a respective end of the spreader structure and a point of contact or connection of the straps to the bridge span, each end of the spreader structure operatively associated with a connector for connecting a strap, for example a shackle, the webbing or cable optionally looped around the shackle.

Optionally, the distance between connectors at opposite ends of a spreader structure is longer than the width of the gantry.

Optionally, the bridge span is outfitted with a connector that receives a strap. Optionally, the connector is adapted to be attached to a lug on the bridge span. Optionally, the connector is a shackle.

A connector is optionally configured so that straps move transversely with respect to the longitudinal axis of the gantry to increase transverse play of the straps with respect to the ends of the spreader structure or the bridge span.

Optionally, a connector is configured to permit the sling arm to have play in plane parallel to longitudinal axis of the gantry, for example, the connector attached to the spreader structure.

Optionally, as described above, the vertical support and lift system is a hydraulically powered, each vertical support assembly optionally comprising two telescoping leg portions wherein the linear distance between the ground engaging portion of each leg portion and the gantry is adapted to be hydraulically varied by the power system.

According to another aspect the invention is directed to a system for removal or placement of a train bridge-span of the type which spans and is supported by two piers, comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system (27) including at least one rail car;

the gantry assembly adapted to support a gantry conveyance system, the gantry conveyance system adapted to cooperate with a load-bearing ground conveyance system, the gantry conveyance system including or operatively associated with bridge support portions adapted to provide at least two points of support for supporting the bridge span from two positions on the bridge span proximal to the ends of the bridge span;

the vertical support and lift system adapted for supporting a combined weight of the gantry and a bridge span from first ground-support locations in at least one operational vertical position above the respective bridge span support-surfaces of the piers at least one operational vertical position corresponding to position(s) including at least one horizontal transport plane and a disembarking plane in which the leg portions are extendable from a stowed position on the pre-installation conveyance system to an extent sufficient for the gantry assembly to self-liftoff the pre-installation conveyance system onto the first ground support locations to effect a gantry installation.

Optionally, wherein the gantry assembly and/or the gantry conveyance system define bridge span position limits that delimit a maximum horizontal travel distance that the bridge span can be conveyed in the horizontal transport plane when supported by the gantry conveyance system; and the ground conveyance system is adapted to be transported on a path extending away from a ground position adjacent to an edge of an existing bridge span, a bridge span position limit and/or the path accommodating conveyance of the bridge through at least a threshold horizontal conveyance distance required for transferring load support from the gantry conveyance system to the ground conveyance system and/or from the ground conveyance system to the gantry conveyance system.

Other embodiments of the system for organizing removal and replacement of a train bridge span will now be described.

The system optionally comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system including at least one rail car;

the gantry assembly adapted to support a gantry conveyance system, the gantry conveyance system adapted for horizontally conveying a bridge span in a horizontal transport plane relative to the gantry assembly over distance sufficient to transfer a load corresponding to the weight of the bridge span in stages onto a support portion of a ground conveyance system, the gantry conveyance system including or operatively associated with a support portion adapted to provide support for supporting the bridge span from two positions on the bridge span, the positions proximal to the respective ends of the bridge span;

the vertical support and lift system adapted for supporting the gantry from first ground-support locations in at least one operational vertical position above the respective bridge span support-surfaces of the piers at least one operational vertical position corresponding to position(s) including a disembarking plane in which the leg portions are extendable from a stowed position on the pre-installation conveyance system to an extent sufficient for the gantry assembly to self-liftoff the pre-installation conveyance system onto the first ground support locations.

Optionally, the vertical support and lift system is adapted for supporting the gantry in the horizontal transport plane.

Optionally, the gantry assembly and the support portion are operatively associated with a lift system, the lift system adapted for raising a bridge from the piers into the horizontal transport plane and lowering a bridge span onto the piers from a horizontal transport plane.

Optionally, the gantry conveyance system is adapted for horizontally conveying a bridge span in a horizontal transport plane relative to the gantry assembly over distance sufficient to transfer a load corresponding to the weight of the bridge span in stages from a support portion of a ground conveyance system to the gantry conveyance system.

According a related aspect, the invention is directed to a system for removal or placement of a train bridge-span of the type which spans and is supported by two piers, comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system including at least one rail car;

the gantry assembly adapted to support a gantry conveyance system, the gantry conveyance system adapted for supporting the weight of a bridge span and configured for conveying a bridge span in a horizontal transport plane along at least a portion of the length of the gantry, the gantry conveyance system adapted to cooperate with a load-bearing ground conveyance system.

Embodiments of the systems as defined above will now be summarized.

Optionally, the gantry conveyance system is adapted to cooperate with a bridge span connection system, the gantry conveyance system and bridge span connection system cooperating to provide at least two separately locatable or independently locatable suspension means for supporting the bridge span from two positions on the bridge span proximal to the ends of the bridge span.

The vertical support and lift system is adapted for supporting a combined weight of the gantry and a bridge span in operational vertical positions above the respective bridge span support-surfaces of the piers including, the operational vertical positions corresponding to the at least one horizontal transport plane and a disembarking plane in which the leg portions are extended (e.g. by controlling a power system operatively associated with the vertical support and lift system) from a stowed position on the pre-installation conveyance system to an extent sufficient for the gantry assembly to self-lift off the pre-installation conveyance system onto the first ground support locations to effect a gantry installation.

Optionally, the gantry assembly and/or the gantry conveyance system define suspension means position limits that delimit a maximum horizontal travel distance that the suspension means can travel in the horizontal transport plane when supporting a load comprising at least a portion of the weight of the bridge span.

Optionally, the ground conveyance system is adapted to be transported on a path extending away from a ground position adjacent to an edge of an existing bridge span, a suspension means position limit and/or the path accommodating conveyance of the bridge through at least a threshold horizontal conveyance distance required for transferring load support from the gantry conveyance system to the ground conveyance system and/or from the ground conveyance system to the gantry conveyance system.

Optionally, as described above, the vertical support and lift system includes:

a load bearing first vertical support assembly (2) operatively connected to the gantry proximal to a first end thereof; and a load-bearing second vertical support assembly operatively connected to the gantry proximal to a second end thereof each vertical support assembly including two leg portions having a ground engaging portions and a gantry connection portion for connecting the leg portions to the gantry, the vertical support and lift system including or adapted to be operatively associated with a power system and a control system to vary the linear vertical distance between the ground engaging portion of a leg portion and the gantry to control the vertical height of the gantry.

Optionally, as described above, the gantry assembly and/or the gantry conveyance system at least partially define bridge span position limits that delimit a minimum horizontal transport distance over which the bridge span can be conveyed with at least partial load support from the gantry conveyance system, the minimum horizontal transport distance extending beyond the first ground locations.

Optionally, as described above, the gantry connection portion includes an outrigger portion configured to laterally distance at least one leg portion (preferably both) of at least one vertical support assembly from lateral perimeters of the gantry, whereby the outrigger portion is adapted to accommodate passage of a bridge span, wider than the gantry, between the leg portions of at least one vertical support assembly to accommodate transfer of load support from the gantry conveyance system to the ground conveyance system and/or from the ground conveyance system to the gantry conveyance system.

Optionally, as described above, the at least one rail car of the pre-installation conveyance system defines a conveyance system footprint area including lateral perimeters, the gantry configured to have a gantry footprint area having lateral perimeters which fit within the lateral perimeters of the pre-installation conveyance system, the outrigger portion adapted to position leg portions of at least one vertical support assembly beyond the lateral perimeters of the footprint area of the pre-installation conveyance system, to clear the lateral perimeters of the pre-installation conveyance system, when the gantry legs are lowered to effect a gantry installation.

Optionally, as described above, the outrigger portion and leg portions of at least vertical support assembly are rotationally mounted with respect to positionally-fixed portions of the gantry connection portion, for movement about a vertical axis perpendicular to the longitudinal axis of the gantry between a stowed position in which the outrigger portion and leg portion are rotated towards the gantry and a laterally extended installation position.

Optionally, the lateral perimeters of the gantry assembly footprint when the gantry assembly in supported on the pre-installation conveyance system in the stowed position lie within existing railway clearances for the delivering the gantry assembly to or from a site of placement or removal of a bridge span.

According to yet another aspect, the invention is directed to a method of organizing installation or replacement of a train bridge span of the type which spans and is supported by two piers (25) of a train bridge, each pier having and a bridge span support-surface (22), the method comprising:

using a pre-installation conveyance system including at least one rail car to convey a gantry assembly, supported in a horizontal position, into horizontal alignment with a plurality of load-bearing first ground-support locations, wherein the gantry assembly overlies an existing bridge span supporting a train track, the pre-installation conveyance system defining a pre-installation conveyance system footprint area having lateral perimeters;

the gantry assembly comprising a gantry and a ground-engaging vertical support and lift system including leg portions each having a ground engaging portion for supporting the leg portions on respective first ground-support locations;

the gantry assembly adapted to be operatively associated with a gantry conveyance system and a bridge span connection system adapted for horizontally conveying a raised existing bridge span in a horizontal transport plane relative to the gantry assembly over distance sufficient to transfer a load corresponding to the weight of the existing bridge span in at least one stage onto a support portion of a ground conveyance system;

the vertical support and lift system adapted supporting a combined weight of the gantry and a bridge span in at least one operational vertical position above the respective bridge span support-surfaces of the piers, and extending the leg portions into installed positions from stowed positions on the pre-installation conveyance system, the at least one operational vertical position including a position corresponding to:

the horizontal transport plane;

a pre-installation conveyance system disembarking plane, in which the gantry legs are extendable to self-lift the gantry assembly off the pre-installation conveyance system to effect a gantry installation; and controlling the vertical support and lift system to lift the gantry assembly off the pre-installation conveyance system to position the first and second vertical assemblies on the first ground locations.

According to another embodiment of the method, the invention is directed to a method of organizing installation or replacement of a train bridge span of the type which spans and is supported by two piers of a train bridge, the method comprising:

using a pre-installation conveyance system including at least one rail car to convey a gantry assembly, supported in a horizontal position, into horizontal alignment with a plurality of load-bearing first ground-support locations;

the gantry assembly comprising a gantry and a ground-engaging vertical support and lift system including leg portions each having a ground engaging portion for supporting the leg portions on respective first ground-support locations;

the gantry assembly adapted to be operatively associated with a gantry conveyance system adapted for horizontally conveying a bridge span in a horizontal transport plane relative to the gantry assembly over distance sufficient to transfer a load corresponding to the weight of the existing bridge span in at least one stage onto a support portion of a ground conveyance system;

the vertical support and lift system adapted supporting a combined weight of the gantry and a bridge span in at least one operational vertical position above the respective bridge span support-surfaces of the piers, the at least one position corresponding to:

the horizontal transport plane;

a pre-installation conveyance system disembarking plane, in which the gantry legs are extendable to self-lift the gantry assembly off the pre-installation conveyance system to effect a gantry installation;

Controlling the vertical support and lift system to lift the gantry assembly off the pre-installation conveyance system to position the first and second vertical assemblies on the first ground locations.

According to another embodiment of the method, the invention is directed to a method of organizing installation or replacement of a train bridge span of the type which spans and is supported by two piers of a train bridge, each pier having and a bridge span support-surface, the method comprising:

using a pre-installation conveyance system (27) including at least one rail car to convey a gantry assembly, supported in a horizontal position, into horizontal alignment with a plurality of load-bearing first ground-support locations;

the gantry assembly comprising a gantry and a ground-engaging vertical support and lift system, the vertical support and lift system operatively associated with a control system and including leg portions, each leg portion having a ground engaging portion for supporting the leg portions on respective first ground-support locations;

the vertical support and lift system adapted to support the gantry in at least one operational vertical position above the respective bridge span support-surfaces of the piers, the at least one position corresponding to disembarking plane in which the leg portions are extended by the control system from a stowed position on the pre-installation conveyance system to an extent sufficient for the gantry assembly to self-liftoff the pre-installation conveyance system onto the first ground-support locations; and controlling the vertical support and lift system such that the gantry assembly self-lifts off the pre-installation conveyance system onto the first ground support locations.

It is to be understood that the vertical support and lift system is powered to lift a suitable load and that a control system used for controlling the vertical support and lift system is at least adapted to control the vertical height of the gantry.

According to another embodiment, a gantry assembly is adapted to be operatively associated a gantry conveyance system supported by the gantry and a ground conveyance system, the ground conveyance system including a support portion for supporting the bridge span, the gantry conveyance system operatively associated with a control system and a power system and adapted for conveying a bridge span in a horizontal transport plane relative to the gantry assembly over distance sufficient to transfer a load corresponding to the weight of the bridge span from the gantry conveyance system to the support portion of the ground conveyance system from the support portion of the ground conveyance system to the gantry conveyance system.

The gantry conveyance system including two conveyable separately locatable bridge span support means e.g. a suspension means, for supporting the bridge span, the gantry assembly and the support means operatively associated with a lift system (e.g. a winch), the lift system adapted for raising a bridge from the piers into the horizontal transport plane and lowering a bridge span onto the piers from a horizontal transport plane.

Additional embodiments of the methods are now summarized.

Optionally, as described above, the ground engaging vertical support and lift system comprises a first vertical support assembly for supporting the gantry proximal to one end thereof and a second vertical support assembly for supporting the gantry proximal to the opposite end thereof, each vertical support assembly comprising leg portions, a gantry connection portion for connecting a leg portion to the gantry and a ground engaging portion for supporting a leg portion on a first ground-support location, the vertical support and lift system adapted to be operatively associated with a power system and a control system, the vertical support and lift system, power system and control system adapted for controlling the linear vertical distance between the ground engaging portion of a leg portion and the gantry so as control the vertical height of the gantry.

Optionally, as described above, the distance between the lateral perimeters of the pre-installation conveyance system is wider that the width of the gantry, the gantry assembly configured such that the ground-engaging portions of the leg portions are suspended outside the lateral perimeters of the pre-installation conveyance system footprint area in the stowed position so as to provide lateral clearance for the ground engaging portions to be extended into installation positions on the first ground-support locations and for the pre-installation system to be removed from above the existing bridge span.

Optionally, the method further comprises:

bringing a ground conveyance system into horizontal alignment with load-bearing second ground-support locations in which the ground conveyance system is positioned on a path defined by a portion of a train track contiguous with the train track overlying the existing bridge span, the gantry conveyance system comprising a track and at least one vehicle conveyable on the track, the at least one vehicle adapted to be operatively associated with the bridge span connection system for suspending the bridge span from the at least one vehicle beneath the gantry, the gantry conveyance system and bridge span connection system adapted for supporting the weight of a bridge span beneath the gantry for conveyance in a substantially horizontal plane on the track along at least a portion of the length of the gantry, the gantry assembly and/or the gantry conveyance system defining a vehicle position limit that delimits a maximum horizontal travel distance that the at least one vehicle can travel in the horizontal transport plane when supporting a load comprising at least a portion of the weight of the existing bridge span, a vehicle position limit and/or the path defining a threshold horizontal displacement distance which is at least sufficient to transfer load support from the gantry conveyance system to the ground conveyance system;

adjusting the height of the gantry, if and as necessary, connecting the bridge span connection system between the bridge span and the gantry conveyance system, such that the bridge span is prepared to be suspended from the gantry conveyance system when the gantry is lifted by the vertical support and lift system into the at least one horizontal transport plane;

Controlling the vertical support and lift system to raise train bridge span into the least one horizontal transport plane;

Using the gantry conveyance system to convey the bridge span into at least one load transferring position overlying the support portion of the ground conveyance system, the load transferring position adapted for transferring a load corresponding to the weight of the bridge span from the gantry conveyance system to the ground conveyance system; and Transferring a load corresponding to the weight of the bridge span, from the gantry conveyance to the ground conveyance system, the control system controllable to lower the existing bridge span onto the support portion of the ground conveyance system.

Optionally, the method further comprises:

Using the gantry conveyance system to convey the bridge span towards a vehicle position limit into a load-transferring first position overlying the ground conveyance system;

Transferring the load attributable to a forward end portion of the bridge span to the ground conveyance system;

Using the ground conveyance system in combination with the gantry conveyance system to convey the train bridge span beyond the vehicle position limit to a load transferring second position in which the load attributable to a rearward end portion of the existing bridge span is transferable to the ground conveyance system; and Transferring a load attributable to the rearward end-portion of the existing bridge span to the ground conveyance system, such that the existing bridge is removable from a site of replacement of an existing bridge span.

Optionally, the method further comprises:

Using a second ground conveyance system to convey a replacement bridge span into alignment with load bearing third ground-support locations corresponding to portions of a train track leading to the rearward pier in which at least a forward end the replacement bridge span is positioned under the gantry conveyance system;

Transferring a load attributable to at least a forward end portion of the replacement train-bridge span to the gantry conveyance system and a bridge span connection system;

Using the gantry conveyance system and the second ground conveyance system to convey the replacement bridge span into horizontal alignment with a third ground-support location in which a rearward end portion of the replacement bridge span is positioned under the gantry conveyance system and transferring a load attributable to the rearward end portion of the replacement train-bridge span to the gantry conveyance system and bridge span connection system;

Using the gantry conveyance system and bridge span connection system to convey the replacement bridge span into horizontal alignment with bridge span support-surfaces of the first and second piers;

Using the control system to lower the replacement bridge span onto the bridge span support-surfaces of the first and second piers.

Optionally, the method further comprises:

Removing the bridge span connection system from the replacement bridge span.

Adjusting the height of the gantry, as necessary, conveying a post-installation conveyance system including a support bed configured to support the gantry installation under the gantry installation and using the lift system to lift the ground engaging portions of the vertical support system from the first ground-support locations such that the weight of the gantry installation is transferred onto the post-installation conveyance system;

Transporting the gantry installation away the replacement bridge span.

Optionally, the method is executed according to a schedule that accommodates a scheduled maximum delay of train traffic across the train bridge, the path at least sufficient of sufficient length to convey the existing bridge span to a site for off-loading the existing bridge span.

Optionally, a combined footprint of the pre-installation conveyance system and gantry assembly supported thereon is accommodated by an existing train route for bringing the gantry assembly onto a gantry installation worksite including through or via any train tunnel, train track or train station along the existing train route.

Optionally, a combined footprint of the post-installation conveyance system and gantry assembly supported thereon is accommodated by an existing train route for bringing the gantry assembly off a gantry installation worksite and optionally onto a new gantry installation worksite including through or via any train tunnel, train track or train station along the existing train route.

Optionally, the pre-installation conveyance system comprises a forward rail car which supports a forward end portion of the gantry installation and a rearward rail car which supports a rearward end of the gantry installation, and wherein the combined footprint area of the rail cars is approximately 10 ft. wide by 130 ft. long.

Optionally, each vertical support assembly includes a gantry connection portion and a pair of laterally separated leg portions having ground-engaging portions adapted for supporting the gantry on the ground at the load-bearing first ground-support locations, the gantry connection portion preferably including an outrigger portion configured to laterally displace the leg portions of the vertical support assemblies from lateral perimeters of the gantry, the lateral displacement accommodating passage of bridge span between the leg portions of the first and second vertical support assemblies when an a bridge span is transported into a load transferring position, the outrigger portion preferably configured to position the leg portions of a vertical support assembly perpendicularly to the gantry outside at least the lateral perimeters of the pre-installation conveyance system with the ground engaging leg portions preferably overlying the first ground-support locations such that the gantry assembly is adapted to be installed when the gantry assembly is conveyed into horizontal alignment with the first ground-support locations and the lift system extends the leg portions thereby lowering the ground engaging portions of the leg portions onto the first ground-support locations to lift the gantry off the pre-installation conveyance system, the at least one vertical position including a vertical position of a height sufficient for the pre-installation conveyance system to be moved under the gantry assembly.

Optionally, the bridge span connection system is a system of one more straps operatively connected to the gantry conveyance system, and adapted to suspend a bridge span beneath the gantry in a horizontal orientation for transport in the at least one horizontal transport plane, the at least one horizontal transport plane having a lower limit optionally defined by a lower limit of the transported bridge span or the bridge span support surface of the ground conveyance system.

Optionally, the ground conveyance system is adapted to be positioned on load-bearing second ground-support locations in the vicinity of the bridge-span support surface of the first pier, the ground conveyance system adapted to be driven on a path preferably defined by a train track, the path defining a horizontal displacement distance which extends the forward horizontal vehicle position limit of the track system on one side of the gantry by a distance sufficient to transfer full load support from the gantry conveyance system to the ground conveyance system, the ground conveyance system including a support portion for supporting the weight of a bridge span, wherein the vertical support system and lift system are adapted to raise the gantry to a height in which the lower limit of the first horizontal transport plane is above and clears the support portion of the ground conveyance system, such that the train bridge span can be conveyed by the gantry conveyance system into horizontal alignment with a forward vehicle position limit overlying a support surface of the ground conveyance system, such that the bridge span can be received for support on the support surface of the ground conveyance system for conveyance through the horizontal displacement distance, optionally using the lift system to lower the bridge span on the ground conveyance system.

Optionally, the gantry conveyance system and bridge span connection system are adapted to support the bridge span from points of suspension on both sides of the gantry.

Optionally, the gantry conveyance system comprises two separately locatable vehicles, each respective vehicle conveyable along the gantry to a respective horizontal vehicle position limit and to a relative horizontal position limit defined by the relative position of the vehicles on either end of the gantry, separation of the vehicles towards the horizontal vehicle displacement limits adapted to suspend the bridge span from both ends of the gantry, each vehicle operatively connected to a spreader structure, the spreader structure, oriented transversely with respect to the longitudinal axis of the gantry for distancing two points of suspension of the bridge span from the center of gravity of a vehicle, the spreader structure thereby configured to suspend the bridge span from two sides of the gantry.

Optionally, the bridge span connection system comprises straps, each end of spreader structure displaced sufficiently from center of gravity of the vehicle to define a line of sight between a respective end of the spreader structure and a point of contact or connection of the bridge span connection system to the bridge span, each end of the spreader structure operatively associated with a connector for connecting a strap.

Optionally, the gantry conveyance system includes a self-propelled forward vehicle and a self-propelled rearward vehicle riding on the track system and wherein the ground conveyance system comprises a forward rail car and a rearward rail car, each rail car having a bridge span support bed, wherein in operation:

the existing bridge span is raised into the at least one horizontal transport plane by actuation of the vertical support and lift system and transported in a horizontal plane by the forward vehicle and rearward vehicle until the forward vehicle approaches a forward vehicle position limit in which the existing bridge span is positioned above the support bed of the forward rail car, and wherein a portion of the load attributable to the forward end portion of the existing bridge span is then transferred onto the forward rail car, preferably by using the lift system to lower the gantry; and wherein the existing train bridge span is then conveyed toward a full ground support position with at least partial support from the forward rail car supporting a forward end portion of the bridge span and the rearward vehicle supporting a rearward end portion of the bridge span until the rearward end portion of the bridge span is positioned above the support bed of the rearward rail car and wherein the load is then transferred onto a support bed of the rearward rail car preferably by using the lift system to lower the gantry.

Optionally, the second ground conveyance system includes a forward rail car and rearward rail car, comprising:

Using the second ground conveyance system to convey a replacement bridge span into alignment with load bearing third ground-support locations in which a forward end the replacement bridge span is positioned under the forward vehicle;

Transferring a load corresponding to a forward end portion of the replacement bridge span to the forward vehicle and a bridge span connection system;

Using the gantry conveyance system and the second ground conveyance system to convey the replacement bridge span into horizontal alignment with a third ground-support location in which a rearward end portion of the replacement bridge span is positioned under the rearward vehicle and transferring a load attributable to the rearward end portion of the replacement train-bridge span to the rearward vehicle and bridge span connection system;

Using the gantry conveyance system and bridge span connection system to convey the replacement bridge span into horizontal alignment with bridge span support-surfaces of the first and second piers;

Using the lift system to lower the replacement bridge span onto the bridge span support-surfaces of the first and second piers.

Optionally, the method further comprises:

Removing the bridge span connection system from the replacement bridge span;

Adjusting the height of the gantry as necessary, conveying a post-installation conveyance system including a support bed configured to support the gantry installation under the gantry installation and using the lift system to lift the ground engaging portions of the vertical support system from the first ground-support locations such that the weight of the gantry installation is transferred onto the post-installation conveyance system.

Optionally, the lift system is a hydraulic jack system wherein the leg portions of the first and second vertical support assemblies are hydraulic legs.

A method of organizing installation or replacement of a train bridge span of the type which spans and is supported by two piers (25) of a train bridge, each pier having and a bridge span support-surface (22), the method comprising:

using a pre-installation conveyance system (27) including at least one rail car to convey a gantry assembly, supported in a horizontal position, into horizontal alignment with a plurality of load-bearing first ground-support locations;

the gantry assembly comprising a gantry and a ground-engaging vertical support and lift system, the vertical support and lift system operatively associated with a control system and including leg portions, each leg portion having a ground engaging portion for supporting the leg portions on respective first ground-support locations;

the vertical support and lift system adapted to support the gantry in at least one operational vertical position above the respective bridge span support-surfaces of the piers, the at least one position corresponding to disembarking plane in which the leg portions are extended by the control system from a stowed position on the pre-installation conveyance system to an extent sufficient for the gantry assembly to self-liftoff the pre-installation conveyance system onto the first ground-support locations; and controlling the vertical support and lift system such that the gantry assembly self-lifts off the pre-installation conveyance system onto the first ground support locations.

Optionally, the gantry assembly is adapted to be operatively associated with a gantry conveyance system supported by the gantry and a ground conveyance system, the ground conveyance system including a support portion for supporting the bridge span, the gantry conveyance system operatively associated with a control system and a power system and adapted for conveying a bridge span in a horizontal transport plane relative to the gantry assembly over distance sufficient to transfer a load corresponding to the weight of the bridge span from the gantry conveyance system to the support portion of the ground conveyance system from the support portion of the ground conveyance system to the gantry conveyance system, the gantry conveyance system including two conveyable separately locatable suspension means for supporting the bridge span, the gantry assembly and the support means operatively associated with a lift system, the lift system adapted for raising a bridge from the piers into the horizontal transport plane and lowering a bridge span onto the piers from a horizontal transport plane.

Optionally the method is executed to a schedule that accommodates a scheduled maximum delay of train traffic across the train bridge, the path at least sufficient of sufficient length to convey the existing bridge span to a site for off-loading the existing bridge span.

Optionally, the combined footprint of the pre-installation conveyance system and gantry assembly supported thereon is accommodated by an existing train route for bringing the gantry assembly onto a gantry installation worksite including through or via any train tunnel, train track or train station along the existing train route.

Optionally, a combined footprint of the post-installation conveyance system and gantry assembly supported thereon is accommodated by an existing train route for bringing the gantry assembly off a gantry installation worksite and optionally onto a new gantry installation worksite including through or via any train tunnel, train track or train station along the existing train route.

Optionally, the pre-installation conveyance system comprises a forward rail car which supports a forward end portion of the gantry installation and a rearward rail car which supports a rearward end of the gantry installation. Optionally, the combined footprint area of the rail cars is approximately 5 to 10 ft. wide by 130 ft. long.

Optionally, as described above, each vertical support assembly includes a gantry connection portion and a pair of laterally separated leg portions having ground-engaging portions adapted for supporting the gantry on the ground at the load-bearing first ground-support locations, the gantry connection portion preferably including an outrigger portion configured to laterally displace the leg portions of the vertical support assemblies from lateral perimeters of the gantry, the lateral displacement accommodating passage of bridge span between the leg portions of the first and second vertical support assemblies when an a bridge span is transported into a load transferring position, the outrigger portion preferably configured to position the leg portions of a vertical support assembly perpendicularly to the gantry outside at least the lateral perimeters of the pre-installation conveyance system with the ground engaging leg portions preferably overlying the first ground-support locations such that the gantry assembly is adapted to be installed when the gantry assembly is conveyed into horizontal alignment with the first ground-support locations and the lift system extends the leg portions thereby lowering the ground engaging portions of the leg portions onto the first ground-support locations to lift the gantry off the pre-installation conveyance system, the vertical positions including a vertical position of a height sufficient for the pre-installation conveyance system to be removed from or re-positioned from original support locations beneath the gantry assembly.

Optionally, as described above, the bridge span connection system is a system of one more straps operatively connected to the gantry conveyance system, and adapted to suspend a bridge span beneath the gantry in a horizontal orientation for transport in the at least one horizontal transport plane, the at least one horizontal transport plane having a lower limit optionally defined by a lower limit of the transported bridge span or the bridge span support surface of the ground conveyance system.

Optionally as described above, the ground conveyance system is adapted to be positioned on load-bearing second ground-support locations in the vicinity of the bridge-span support surface of the first pier, the ground conveyance system adapted to be driven on a path preferably defined by a train track, the path defining a horizontal displacement distance which extends the forward horizontal vehicle position limit of the track system on one side of the gantry by a distance sufficient to transfer full load support from the gantry conveyance system to the ground conveyance system, the ground conveyance system including a support portion for supporting the weight of a bridge span, wherein the vertical support system and lift system are adapted to raise the gantry to a height in which the lower limit of the first horizontal transport plane is above and clears the support portion of the ground conveyance system, such that the train bridge span can be conveyed by the gantry conveyance system into horizontal alignment with a forward vehicle position limit overlying a support surface of the ground conveyance system, such that the bridge span can be received for support on the support surface of the ground conveyance system for conveyance through the horizontal displacement distance, optionally using the lift system to lower the bridge span on the ground conveyance system.

Optionally, the gantry conveyance system and bridge span connection system are adapted to support the bridge span from points of suspension on both sides of the gantry.

Optionally, the gantry conveyance system comprises two separately locatable vehicles, each respective vehicle conveyable along the gantry to a respective horizontal vehicle position limit and to a relative horizontal position limit defined by the relative position of the vehicles on either end of the gantry, separation of the vehicles towards the horizontal vehicle displacement limits adapted to suspend the bridge span from both ends of the gantry, each vehicle operatively connected to a spreader structure, the spreader structure, oriented transversely with respect to the longitudinal axis of the gantry for distancing two points of suspension of the bridge span from the center of gravity of a vehicle, the spreader structure thereby configured to suspend the bridge span from two sides of the gantry.

Optionally, the bridge span connection system comprises straps, each end of spreader structure displaced sufficiently from center of gravity of the vehicle to define a line of sight between a respective end of the spreader structure and a point of contact or connection of the bridge span connection system to the bridge span, each end of the spreader structure operatively associated with a connector for connecting a strap.

Optionally, the gantry conveyance system includes a hydraulically powered forward vehicle and a hydraulically powered rearward vehicle riding on the track system and wherein the ground conveyance system comprises a forward rail car and a rearward rail car, each rail car having a bridge span support bed, wherein in operation:

the existing bridge span is raised into the at least one horizontal transport plane by actuation of the vertical support and lift system and transported in a horizontal plane by the forward vehicle and rearward vehicle until the forward vehicle approaches a forward vehicle position limit in which the existing bridge span is positioned above the support bed of the forward rail car, and wherein a portion of the load attributable to the forward end portion of the existing bridge span is then transferred onto the forward rail car, preferably by using the vertical support and lift system to lower the gantry; and wherein the existing train bridge span is then conveyed toward a full ground support position with at least partial support from the forward rail car supporting a forward end portion of the bridge span and the rearward vehicle supporting a rearward end portion of the bridge span until the rearward end portion of the bridge span is positioned above the support bed of the rearward rail car and wherein the load is then transferred onto a support bed of the rearward rail car preferably by using the lift system to lower the gantry.

Optionally, the second ground conveyance system includes a forward rail car and rearward rail car, comprising:

Using the second ground conveyance system to convey a replacement bridge span into alignment with load bearing third ground-support locations in which a forward end the replacement bridge span is positioned under the forward vehicle;

Transferring a load corresponding to a forward end portion of the replacement bridge span to the forward vehicle and a bridge span connection system;

Using the gantry conveyance system and the second ground conveyance system to convey the replacement bridge span into horizontal alignment with a third ground-support location in which a rearward end portion of the replacement bridge span is positioned under the rearward vehicle and transferring a load attributable to the rearward end portion of the replacement train-bridge span to the rearward vehicle and bridge span connection system;

Using the gantry conveyance system and bridge span connection system to convey the replacement bridge span into horizontal alignment with bridge span support-surfaces of the first and second piers; and Using the vertical support and lift system to lower the replacement bridge span onto the bridge span support-surfaces of the first and second piers.

According to one embodiment, a system for removal or placement of a train bridge-span of the type which spans and is supported by two piers, is characterized in that it comprises;

A lift system;

A gantry assembly comprising a gantry and a vertical support system for supporting the gantry, the gantry assembly adapted to be transported in a horizontal position to a site for placement or removal of a bridge span by a pre-installation conveyance system including at least one rail car;

The gantry assembly adapted to be operatively associated with the lift system, the lift system adapted to raise the bridge span from the piers into a horizontal transport plane and to lower a bridge span from a horizontal transport plane onto the piers;

the vertical support system including leg portions having ground engaging portions adapted to be supported on first ground support locations;

the gantry assembly adapted to support a gantry conveyance system, the gantry conveyance system adapted to cooperate with a load-bearing ground conveyance system including a support portion for supporting the bridge span, the gantry conveyance system operatively associated with a bridge span support system which provides at least two points of support for supporting a bridge span from two respective positions on a bridge span proximal to the end portions of the bridge span;

the gantry conveyance system adapted for horizontally conveying a bridge span in a horizontal transport plane relative to the gantry assembly over distance sufficient to transfer a load corresponding to the weight of a bridge span, in stages onto the support portion of a ground conveyance system;

the vertical support system and lift system adapted for supporting a bridge span from the first ground-support locations in at least one operational vertical position above the respective bridge span support-surfaces of the piers, the at least one operational vertical position corresponding to at least one horizontal transport plane and to a disembarking plane in which the leg portions are extendable from a stowed position on the pre-installation conveyance system to an extent sufficient for the gantry assembly to self-liftoff the pre-installation conveyance system onto the first ground support locations.

Optionally, the bridge span support system is a bridge span suspension system. Optionally, the bridge span suspension system comprises load bearing straps attached between the gantry conveyance system and the bridge span.

The bridge span support system is a two point support system supporting the bridge span in relation to gantry conveyance system to enable to bridge span to carried by the gantry conveyance system both independently and together with the ground conveyance system.

According to yet another aspect the invention is directed to the use of a gantry assembly installation to remove and install a bridge span, for example in accordance with any method or steps of a method herein defined or together with any system or any parts of a system as herein defined.

According to yet another aspect the invention is directed to the use of a gantry assembly to remove and install a bridge span, for example in accordance with any method or steps of a method herein defined or together with any system or any parts of a system as herein defined.

According to yet another aspect the invention is directed to the use of a system as herein defined to remove and install a bridge span, for example in accordance with any method or steps of a method herein defined.

OTHER EMBODIMENTS

A vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to operatively associated with a gantry conveyance system;

the vertical support and lift system adapted for supporting a combined weight of the gantry and a bridge span in at least one operational vertical position above respective bridge span support-surfaces of the piers including a position corresponding to a disembarking plane in which the leg portions are extended from a stowed position to an extent sufficient for the gantry assembly to self-liftoff the pre-installation conveyance system onto the first ground-support locations to effect the gantry assembly installation.

A vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to operatively associated with a gantry conveyance system adapted to support the weight of the bridge span and a ground conveyance system;

the vertical support and lift system including leg portions having ground engaging portions and a gantry connection portion including an outrigger portion, the vertical support and lift system adapted for supporting a combined weight of the gantry and a bridge span in at least one operational vertical position above respective bridge span support-surfaces of the piers including a position corresponding to a horizontal transport plane in which the bridge span is conveyed by the gantry conveyance system along at least a portion of gantry.

A vertically-adjustable gantry assembly installation adapted for removal or placement of a train bridge-span of the type which spans and is supported by two piers, comprising:

A gantry assembly positioned on load-bearing first ground-support locations, the gantry assembly comprising a gantry and a ground-engaging vertical support and lift system, the gantry assembly adapted to operatively associated with a gantry conveyance system and a ground conveyance system;

the vertical support and lift system adapted for supporting a combined weight of the gantry and a bridge span in at least one operational vertical position above respective bridge span support-surfaces of the piers including a position corresponding to a disembarking plane in which the gantry assembly is adapted to self-liftoff the pre-installation conveyance system onto the first ground-support locations to effect the gantry assembly installation, the vertical support and lift system including leg portions, the leg portions including ground engaging portions, the ground engaging portions including overhang portions of a ground support structure, the leg portions operatively associated with an alignment system for aligning the overhang portions with ground-support portions of the ground support structure.

A gantry assembly for removal or placement of a train bridge-span of the type which spans and is supported by two piers, comprising:

A gantry;

A ground-engaging vertical support and lift system;

the vertical support and lift system including:

a load bearing first vertical support assembly operatively connected to the gantry proximal to a first end thereof; and a load-bearing second vertical support assembly operatively connected to the gantry proximal to a second end thereof;

the gantry assembly adapted to support a gantry conveyance system, the gantry conveyance system adapted to be operatively associated with a bridge span support system for supporting the bridge span from at least two positions on the bridge span proximal to the ends of the bridge span;

the vertical support and lift system adapted for supporting a combined weight of the gantry and a bridge span in at least one operational vertical position above the respective bridge span support-surfaces of the piers including at least one position corresponding to a horizontal transport plane.

Optionally, each vertical support assembly includes at least one leg portion having a ground engaging portion and a gantry connection portion for connecting the leg portions to the gantry, the gantry connection portion including an outrigger portion, the vertical support and lift system including or adapted to be operatively associated with a power system and a control system to vary the linear vertical distance between the ground engaging portion of a leg portion and the gantry to control the vertical height of the gantry.

Optionally, the at least one vertical position includes a position corresponding to a pre-installation conveyance system disembarking plane.

Optionally, the vertical support and lift system is adapted to be operatively associated with an alignment system for aligning the ground engaging portions of the leg portions with the first ground support locations.

A gantry assembly for removal or placement of a train bridge-span of the type which spans and is supported by two piers, comprising:

A gantry;

A ground-engaging vertical support and lift system;

the gantry assembly configured to be transported in a horizontal position to a site for placement or removal of a bridge span by a pre-installation conveyance system including at least one rail car;

the vertical support and lift system including:

a load bearing first vertical support assembly operatively connected to the gantry proximal to a first end thereof; and a load-bearing second vertical support assembly operatively connected to the gantry proximal to a second end thereof, each vertical support assembly including at least one leg portion having a ground engaging portion and a gantry connection portion for connecting the leg portions to the gantry, the vertical support and lift system adapted for supporting a combined weight of the gantry and a bridge span from first ground-support locations in at least one operational vertical position above the respective bridge span support-surfaces of the pier, at least one position corresponding to a disembarking plane in which the leg portions are extendable to an extent at least sufficient for the gantry assembly to self-lift off the pre-installation conveyance system onto the first ground-support locations.

A system for removal or placement of a train bridge-span of the type which spans and is supported by two piers, comprising:

A gantry assembly comprising a gantry and a ground-engaging vertical support and lift system, the gantry assembly adapted to be transported in a horizontal position to a site for placement or removal of a bridge span by a pre-installation conveyance system including at least one rail car;

the vertical support and lift system including:

a load bearing first vertical support assembly operatively connected to the gantry proximal to a first end thereof; and a load-bearing second vertical support assembly operatively connected to the gantry proximal to a second end thereof, each vertical support assembly including at least one leg portion having a ground engaging portion and a gantry connection portion for connecting the leg portions to the gantry, the vertical support and lift system including or adapted to be operatively associated with a power system and a control system to vary the linear vertical distance between the ground engaging portion of a leg portion and the gantry to control the vertical height of the gantry, the vertical support and lift system adapted for supporting a combined weight of the gantry and a bridge span in operational vertical positions above the respective bridge span support-surfaces of the piers including at least one position corresponding to a horizontal transport plane, and a position corresponding to a disembarking plane in which the leg portions are extended by the power system from a stowed position on the pre-installation conveyance system to an extent at least sufficient for the gantry assembly to self-liftoff the pre-installation conveyance system onto the first ground locations such that the pre-installation conveyance system can be removed from above the existing bridge span beneath the gantry assembly to effect a gantry installation;

a gantry conveyance system, supported by the gantry, adapted to independently support the weight of a bridge span, and configured for conveying a bridge span in a substantially horizontal plane along at least a portion of the length of the gantry (100), movement of bridge span relative to the gantry via the gantry conveyance system (10) defining the horizontal transport plane, the gantry conveyance system adapted to be operatively associated with a bridge span connection system for suspending the bridge span from the at least one vehicle beneath the gantry for conveyance in the horizontal transport plane, wherein the gantry conveyance system and bridge span connection system are configured to provide conveyable suspension means for suspending the bridge span beneath the gantry from two positions on the bridge span proximal to the end portions of the bridge span;

the gantry assembly and/or the gantry conveyance system defining suspension means position limits that delimit a maximum horizontal travel distance that the suspension means can travel in the horizontal transport plane when supporting a load comprising at least a portion of the weight of the bridge span;

a load-bearing ground conveyance system including a support portion for supporting a load comprising the weight of a bridge span, the ground conveyance system adapted to be transported on a path extending away from a portion of train rail terminating at the bridge span, a suspension means position limit and/or the path accommodating conveyance of the bridge through at least a threshold horizontal conveyance distance required for transferring load support from the gantry conveyance system to the ground conveyance system and/or from the ground conveyance system to the gantry conveyance system.

Optionally, the vertical support and lift system is adapted to be operatively associated with an alignment system for aligning the ground engaging portions of the leg portions with the first ground support locations.

Optionally, the ground engaging portion of the leg portions include overhang portions of a ground support structure, the alignment system adapted to vertically align the overhang portions with ground-supported portions of the ground support structure.

Optionally, wherein the ground support structure is a beam, optionally a tie beam.

A system for removal or placement of a train bridge-span of the type which spans and is supported by two piers, comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system (27) including at least one rail car;

the gantry assembly adapted to support a gantry conveyance system, the gantry conveyance system adapted to cooperate with a load-bearing ground conveyance system, the gantry conveyance system including support portions adapted to provide at least two points of support for supporting the bridge span from two positions on the bridge span proximal to the ends of the bridge span;

the vertical support and lift system adapted for supporting a combined weight of the gantry and a bridge span from first ground-support locations in at least one operational vertical position above the respective bridge span support-surfaces of the piers at least one operational vertical position corresponding to position(s) including at least one horizontal transport plane and a disembarking plane in which the leg portions are extendable from a stowed position on the pre-installation conveyance system to an extent sufficient for the gantry assembly to self-liftoff the pre-installation conveyance system onto the first ground support locations to effect a gantry installation.

Optionally, the gantry assembly and/or the gantry conveyance system define bridge span position limits that delimit a maximum horizontal travel distance that the bridge span can be conveyed in the horizontal transport plane when supported by the gantry conveyance system;

the ground conveyance system adapted to be transported on a path extending away from a ground position adjacent to an edge of an existing bridge span, a bridge span position limit and/or the path accommodating conveyance of the bridge through at least a threshold horizontal conveyance distance required for transferring load support from the gantry conveyance system to the ground conveyance system and/or from the ground conveyance system to the gantry conveyance system.

A system for removal or placement of a train bridge-span of the type which spans and is supported by two piers, comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system including at least one rail car;

the gantry assembly adapted to support a gantry conveyance system, the gantry conveyance system adapted for horizontally conveying a bridge span in a horizontal transport plane relative to the gantry assembly over distance sufficient to transfer a load corresponding to the weight of the bridge span in stages onto a support portion of a ground conveyance system, the gantry conveyance system including a support portion adapted to provide support for supporting the bridge span from two positions on the bridge span, the positions proximal to the respective ends of the bridge span;

the vertical support and lift system adapted for supporting the gantry from first ground-support locations in at least one operational vertical position above the respective bridge span support-surfaces of the piers at least one operational vertical position corresponding to position(s) including a disembarking plane in which the leg portions are extendable from a stowed position on the pre-installation conveyance system to an extent sufficient for the gantry assembly to self-liftoff the pre-installation conveyance system onto the first ground support locations.

Optionally, wherein the vertical support and lift system is adapted for supporting the gantry in the horizontal transport plane.

Optionally, the gantry assembly and the support portion are operatively associated with a lift system, the lift system adapted for raising a bridge from the piers into the horizontal transport plane and lowering a bridge span onto the piers from a horizontal transport plane.

Optionally, the gantry conveyance system is adapted for horizontally conveying a bridge span in a horizontal transport plane relative to the gantry assembly over distance sufficient to transfer a load corresponding to the weight of the bridge span in stages from a support portion of a ground conveyance system to the gantry conveyance system.

A system for removal or placement of a train bridge-span of the type which spans and is supported by two piers, comprising:

A gantry assembly comprising a gantry, a vertical support system and a lift system, the lift system adapted to raise the bridge span from the piers into a horizontal transport plane and to lower a bridge span from a horizontal transport plane onto the piers, the vertical support system including leg portions having ground engaging portions adapted to be supported on first ground support locations;

the gantry assembly adapted to be transported in a horizontal position to a site for placement or removal of a bridge span by a pre-installation conveyance system including at least one rail car;

the gantry assembly adapted to support a gantry conveyance system, the gantry conveyance system adapted to cooperate with a load-bearing ground conveyance system including a support portion for supporting the bridge span, the gantry conveyance system operatively associated with a bridge span support system adapted to provide at least two points of support for supporting a bridge span from two positions on the bridge span proximal to the end portions of a bridge span;

the gantry conveyance system adapted for horizontally conveying a bridge span in a horizontal transport plane relative to the gantry assembly over distance sufficient to transfer a load corresponding to the weight of a bridge span, in stages onto the support portion of a ground conveyance system;

the vertical support system and lift system adapted for supporting a bridge span from the first ground-support locations in at least one operational vertical position above the respective bridge span support-surfaces of the piers, the at least one operational vertical position corresponding to at least one horizontal transport plane and to a disembarking plane in which the leg portions are extendable from a stowed position on the pre-installation conveyance system to an extent sufficient for the gantry assembly to self-liftoff the pre-installation conveyance system onto the first ground support locations.

Optionally, the bridge span support system is a bridge span suspension system.

Optionally, the bridge span suspension system comprises load bearing straps attached between the gantry conveyance system and the bridge span.

A method of organizing installation or replacement of a train bridge span of the type which spans and is supported by two piers of a train bridge, the method comprising:

using a pre-installation conveyance system including at least one rail car to convey a gantry assembly, supported in a horizontal position, into horizontal alignment with a plurality of load-bearing first ground-support locations;

the gantry assembly comprising a gantry and a ground-engaging vertical support and lift system including leg portions each having a ground engaging portion for supporting the leg portions on respective first ground-support locations;

the gantry assembly adapted to be operatively associated with a gantry conveyance system adapted for horizontally conveying a bridge span in a horizontal transport plane relative to the gantry assembly over distance sufficient to transfer a load corresponding to the weight of the bridge span in stages onto a support portion of a ground conveyance system;

the vertical support and lift system adapted supporting a combined weight of the gantry and a bridge span in at least one operational vertical position above the respective bridge span support-surfaces of the piers, the at least one position corresponding to:

the horizontal transport plane;

a disembarking plane, in which the gantry legs are extendable to self-lift the gantry assembly off the pre-installation conveyance system to effect a gantry installation;

Controlling the vertical support and lift system to lift the gantry assembly off the pre-installation conveyance system to position the first and second vertical assemblies onto the first ground-support locations.

A system for removal or placement of a train bridge-span of the type which spans and is supported by two piers, comprising:

A gantry assembly comprising a gantry and a vertical support and lift system including leg portions having ground engaging portions adapted to be supported on first ground support locations;

the gantry assembly adapted to be transported in a horizontal position to a site for placement or removal of a bridge span by a pre-installation conveyance system (27) including at least one rail car;

the gantry assembly adapted to support a gantry conveyance system, the gantry conveyance system adapted to cooperate with a load-bearing ground conveyance system, the gantry conveyance system including support portions adapted to provide at least two points of support for supporting the bridge span from two positions on the bridge span proximal to the ends of the bridge span;

the vertical support and lift system adapted for supporting a combined weight of the gantry and a bridge span from first ground-support locations in at least one operational vertical position above the respective bridge span support-surfaces of the piers at least one operational vertical position corresponding to position(s) including at least one horizontal transport plane and a disembarking plane in which the leg portions are extendable from a stowed position on the pre-installation conveyance system to an extent sufficient for the gantry assembly to self-liftoff the pre-installation conveyance system onto the first ground support locations to effect a gantry installation.

Optionally, the gantry assembly and/or the gantry conveyance system define bridge span position limits that delimit a maximum horizontal travel distance that the bridge span can be conveyed in the horizontal transport plane when supported by the gantry conveyance system;

the ground conveyance system adapted to be transported on a path extending away from a ground position adjacent to an edge of an existing bridge span, a bridge span position limit and/or the path accommodating conveyance of the bridge through at least a threshold horizontal conveyance distance required for transferring load support from the gantry conveyance system to the ground conveyance system and/or from the ground conveyance system to the gantry conveyance system.

BRIEF DESCRIPTION OF THE DRAWINGS

The present invention will now be described by way of example only with reference to the attached drawings, in which:

FIG. 3 including

FIG. 3A is a simplified view a gantry assembly installation in which the gantry is in an initial lowered position, with opposing ends of an existing bridge span strapped to independently locatable vehicles belonging to a gantry conveyance system;

FIG. 3B shows the gantry raised, with the existing bridge span strapped to independently locatable vehicles belonging to the gantry conveyance system;

FIG. 3C shows the existing bridge span having been moved forward by two vehicles belonging to the gantry conveyance system to a load-transferring position, in which the forward end portion of the bridge span is shown overlying both the rearward and the forward rail car of a ground conveyance system;

FIG. 3D shows an existing bridge span having moved forward into a full ground-support position with cooperative load support by the forward rail car and the rearward vehicle;

FIG. 3E shows a replacement bridge span brought onto third ground-support locations at the gantry assembly installation site by the two rail cars belonging to a second ground conveyance system, the two vehicles belonging to the gantry conveyance system positioned proximal to the rearward end of the gantry, the replacement bridge span being positioned in a load transferring position underneath the forward vehicle of the gantry conveyance system;

FIG. 3F shows a replacement bridge span in a load-transferring position adapted for full-gantry-support with the forward end of the replacement bridge span suspended by the forward vehicle of the gantry conveyance system and rearward end of the replacement bridge span lying underneath the rearward vehicle of the gantry conveyance system;

FIG. 3G shows the gantry raised into a vertically elevated horizontal transport plane, with the replacement bridge suspended via the bridge span connection system by the forward and rearward vehicles of the gantry conveyance system, the forward and rearward vehicles having conveyed the replacement bridge span into horizontal alignment with the bridge span support surfaces of the piers;

FIG. 3H shows the gantry lowered, with the replacement bridge span seated on the bridge span support surfaces of the piers;

FIG. 4A is a schematic representation of one end of a gantry assembly representing a top elevation view of the gantry assembly with the outrigger portions of a vertical support assembly in an installation position;

FIG. 4B is a schematic representation of the end of a gantry assembly representing a top elevation view of the gantry assembly with the outrigger and leg portions of a vertical support assembly in a stowed position.

DETAILED DESCRIPTION OF PREFERRED EMBODIMENT

The invention will now be further described with reference to the drawings.

Gantry Assembly

Figure 1A:
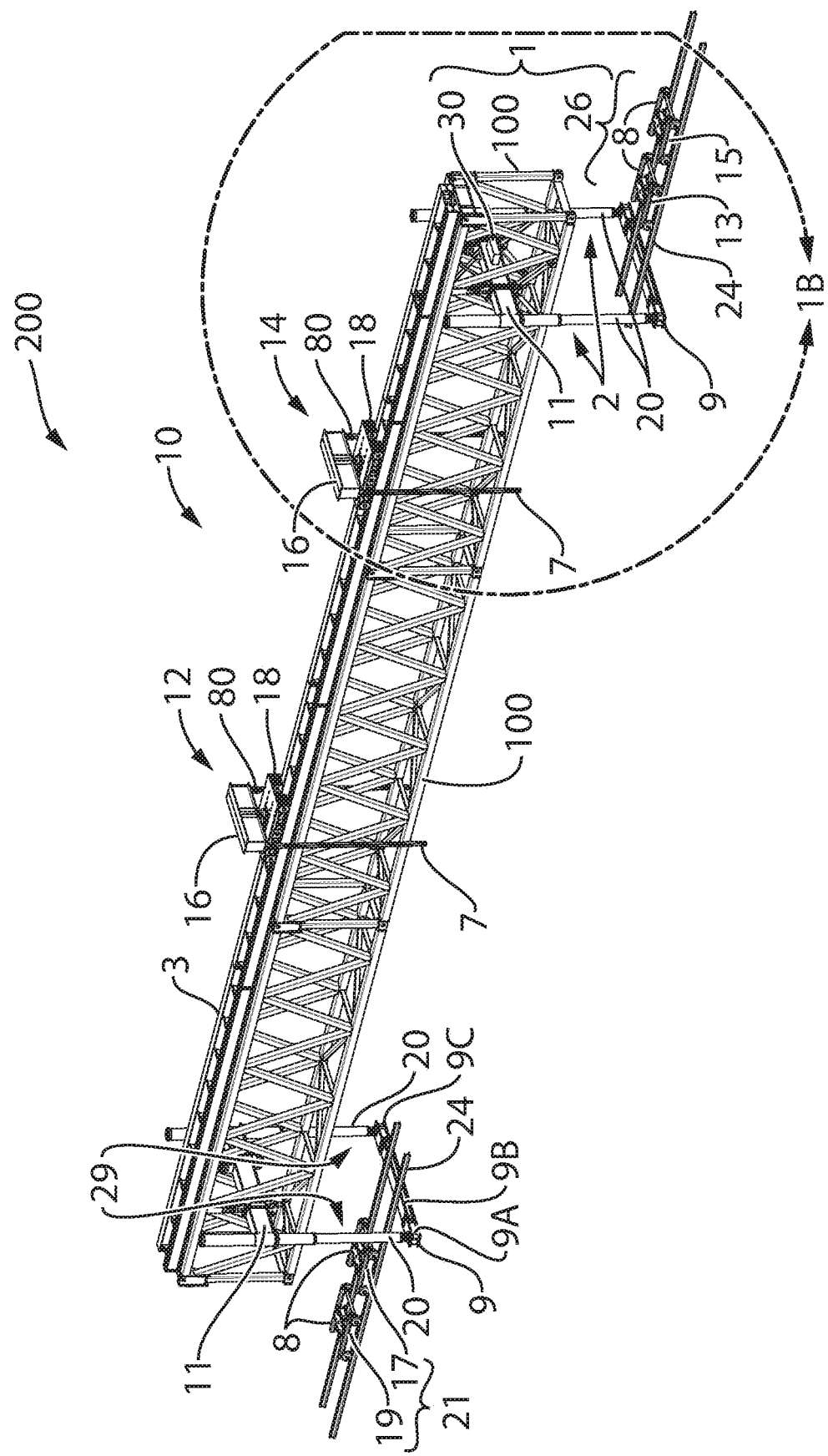
FIG. 1A is a perspective view of a gantry assembly installation according to one embodiment of the invention.

As shown in FIG. 1A, a gantry assembly 1 for removal or placement of a train bridge-span of the type which spans and is supported by two piers comprises a gantry 100 and a ground-engaging vertical support and lift system.

Figure 2:
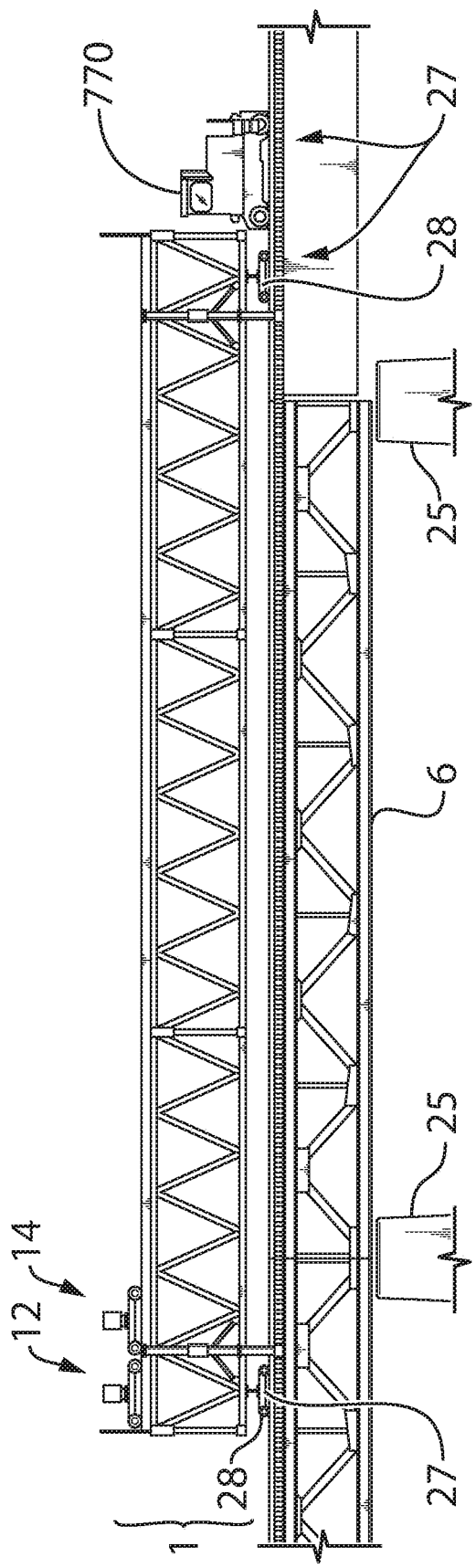
FIG. 2 is a side elevation view of an embodiment of a gantry assembly including a gantry and a vertical support and lift system, supported on a pre-installation conveyance system in accordance with one embodiment of the invention.

As shown in FIG. 2, the gantry assembly 1 is configured to be transported in a horizontal position to a site for placement or removal of a bridge span by a pre-installation conveyance system 27 including at least one rail car 28.

The vertical support and lift system includes a load bearing first vertical support assembly 2 operatively connected to the gantry 100 proximal to a first end thereof and a load-bearing second vertical support assembly 29 operatively connected to the gantry 100 proximal to a second end thereof.

Figure 5B:
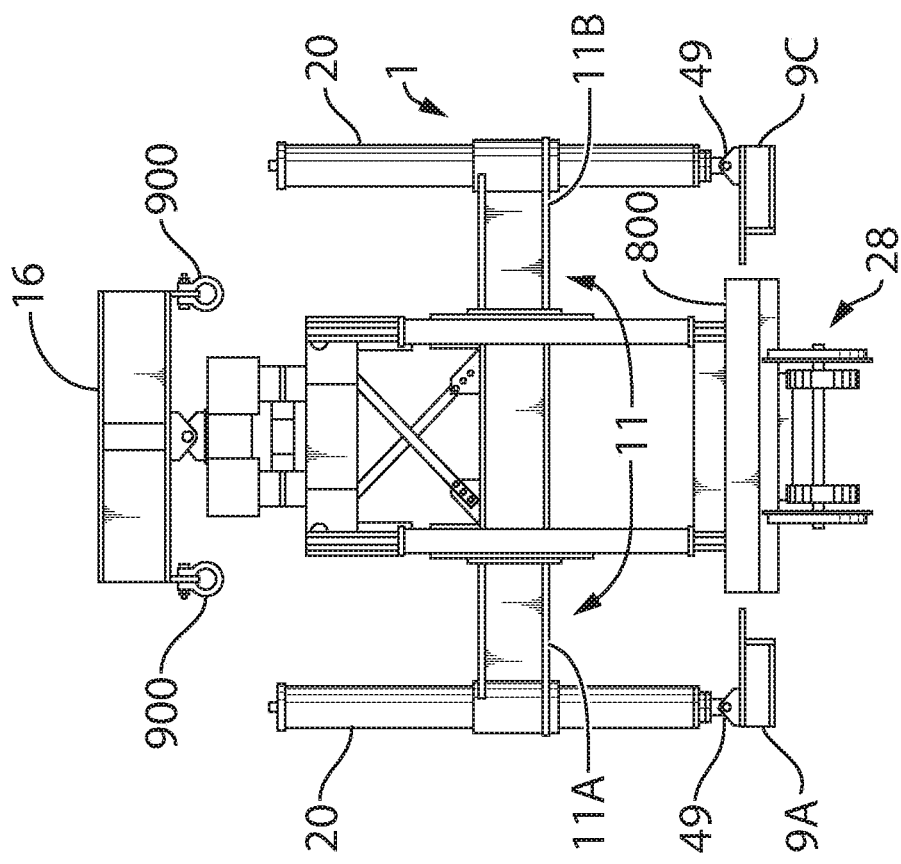
FIG. 5B is a view of the gantry assembly of FIG. 5A, showing the outrigger and leg portions of the vertical support assembly in an installation position.
Figure 5A:
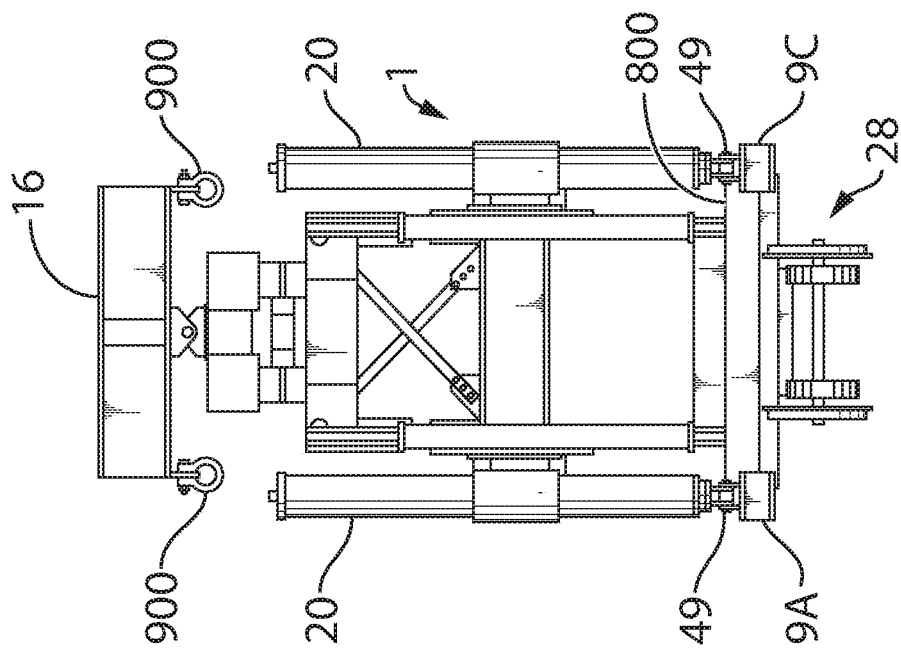
FIG. 5A is an elevation view of the end of a gantry assembly when supported on a rail car of a pre-installation conveyance system showing the outrigger and leg portions of a vertical support assembly in a stowed position.
Figure 5C:
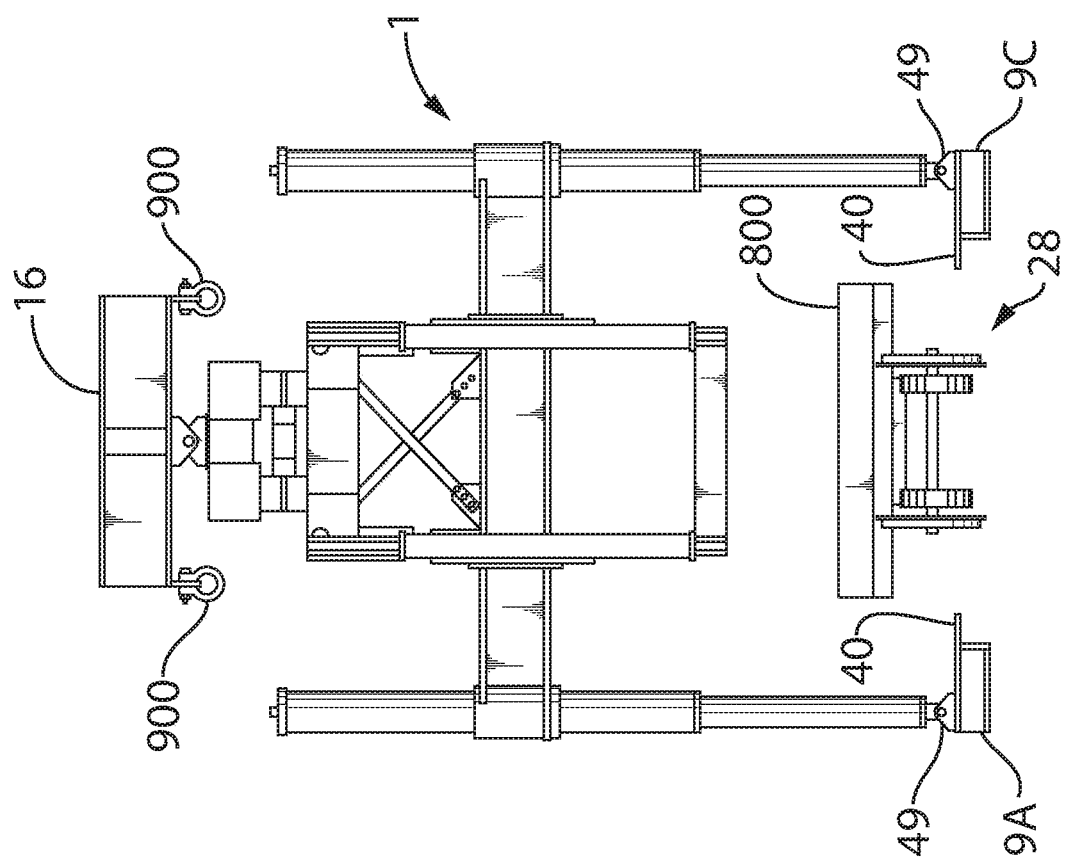
FIG. 5C is an elevation view of an end of a gantry assembly when lifted off a rail car of a pre-installation conveyance system, with the outrigger and leg portions of a vertical support assembly shown in an installation position and showing the legs extended to enable removal of the pre-installation conveyance system from beneath the gantry assembly.

As best seen in FIG. 5A-5C, each vertical support assembly includes two leg portions 20 having a ground engaging portion in the form of foot portion 49 and a gantry connection portion 500 for connecting the leg portions 20 to the gantry 100, the gantry connection portion 500 including an outrigger portion 11 consisting of rotatable portions 11A and 11B, the vertical support and lift system including or adapted to be operatively associated with a power system (see FIG. 1B e.g. a hydraulic power system), and a control system, to vary the linear vertical distance between the ground engaging portion 49 of a leg portion 20 and the gantry 100 to control the vertical height of the gantry 100. The vertical support and lift system is adapted for supporting a combined weight of the gantry and a bridge span in an operational vertical positions above the respective bridge span support-surfaces of the piers including at least one position corresponding to a horizontal transport plane.

As best seen in FIGS. 4A, 4B, 5A and 5B, the outrigger portion 11 (portions 11 A and 11B) of a gantry connection portion 500 together with the leg portions 20 of a vertical support assembly are rotationally mounted with respect to a positionally-fixed portion 600 of the gantry connection portion 500, for movement about a vertical axis perpendicular to the longitudinal axis of the gantry between a stowed position (FIG. 4B) in which the outrigger portion and leg portion are rotated towards the gantry and a laterally extended 'installation position' illustrated in FIG. 4A. In the 'stowed position' (4B) a connection interface of the outrigger portion 11, in the form of a flush plate 610, is securely fastened, for example using a plurality of bolts, to a corresponding interface of the positionally-fixed portion 600 of the gantry connection portion 500, in the form of mating flush plate 615, to prevent rotation and accommodate full load support in the installation position. As best seen in FIGS. 4A and 4B, a left side 11A and a right side 11B of the outrigger portion 11 are independently hingedly-mounted via hinges 612 to a positionally-fixed portion 600 of the gantry connection portion 500.

System

According to one aspect of the invention, the gantry assembly 1 is adapted to cooperate with a power system, a control system, a gantry conveyance system including a track system, a bridge span connection system, a first ground conveyance system and a second ground conveyance system. As shown in FIGS. 1A and 2, according to one embodiment of the invention, the invention is directed to a system 200 for removal or placement of a bridge span 6 of the type which spans and is supported by adjacent piers 25.

Control and Power Systems

Figure 1B:
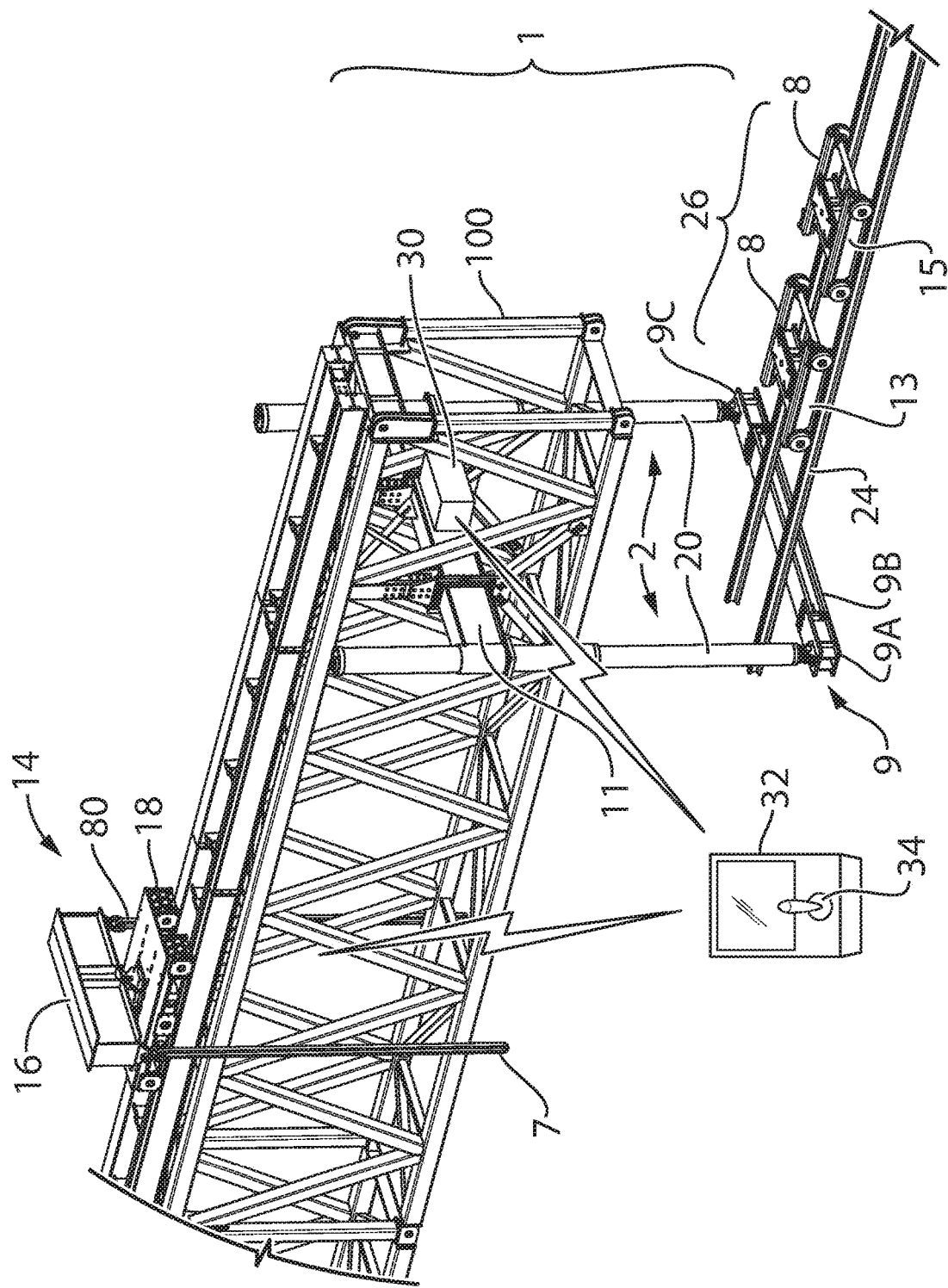
FIG. 1B is an enlarged view of one end of the gantry assembly installation shown in FIG. 1A showing hydraulic power units and a remote control system, and illustrating that the control system is controlling the height of the legs, and movement of the vehicles belonging to the gantry conveyance system.

As shown in FIG. 1B, according to one embodiment, two hydraulic power units 30 carried by the gantry 100 near the ends of the gantry 100, power both the vertical support and lift system and the vehicles of the gantry conveyance system. The power units are schematically shown as two small boxes without intending to comment on their relative size, adjunct parts or surface configuration. The user interface of the control system is optionally localized in a single remote control unit, optionally configured as a computer 32 in a robust tablet format with a joystick 34. The control system may comprise a system of the type known as a computer-aided remote lift (CARL-Lift Systems Inc.) system for coordinating the vertical height of the gantry legs portions 20. Optionally, the same control unit also controls movement of the vehicles 12 and 14 including power supplied to the vehicle hydraulics as well as the direction of movement of the vehicles. Convenient settings enable the joystick to either move the vehicles simultaneously or one or the other individually. A hydraulic power unit 30 is optionally allocated to each vertical support assembly and a vehicle. For example, in terms of capacity is optionally capable of supplying approximately 3000 kN (kilonewtons) of lift force (e.g. at 2500 psi) to each vertical support assembly (to each pair of leg portions).

Gantry Conveyance System

The gantry conveyance system 10 optionally comprises a pair of separately locatable, optionally hydraulically powered vehicles 12 and 14, and a track system including a track 3. However, it will be appreciated that a single vehicle (in the sense of a horizontally conveyable moving structural member to which a bridge span connection system e.g. in the form of straps, is connected may be adapted to support a bridge span 6 at laterally spaced positions representing separately conveyable/locatable points of suspension.

General design parameters affecting the choice of components of the gantry conveyance system 10 include the length of the gantry 100 and the length of the respective vehicle(s), the length of the track 3, whether track 3 overhangs the gantry 100 or is horizontally displaceable relative to the gantry 100, whether the connectors from which supporting rigging is suspended move horizontally in relation to a vehicle etc.

In general, the points of suspension are widely separated when the load is fully supported by the gantry conveyance system. They are more narrowly separated when the load is shared between a ground conveyance system and a gantry conveyance system. In principle, the gantry conveyance system and/or bridge span connection system and/or track system can be adapted so that the distance between suspension means can be both lengthened and shortened, in the course of operation.

Figure 3A:
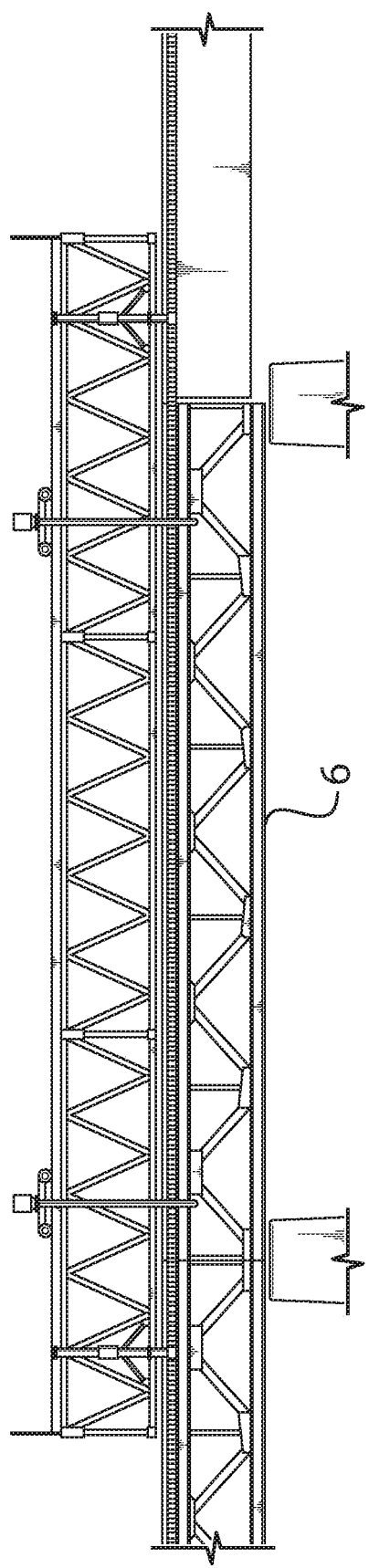
FIGS. 3A-3H is a set of diagrammatic representations of a system according to one embodiment of the invention showing side elevations of a gantry assembly installation in use in various stages of removal and installation of a bridge span, as follows.
Figure 3B:
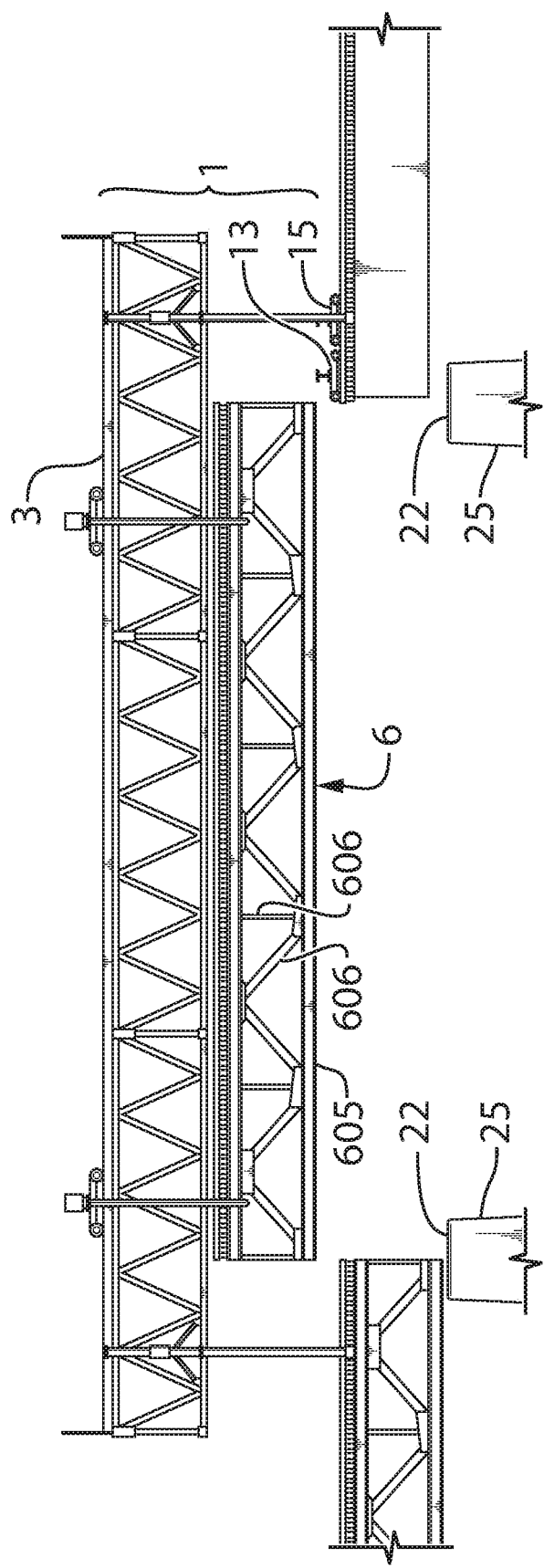
Figure 3C:
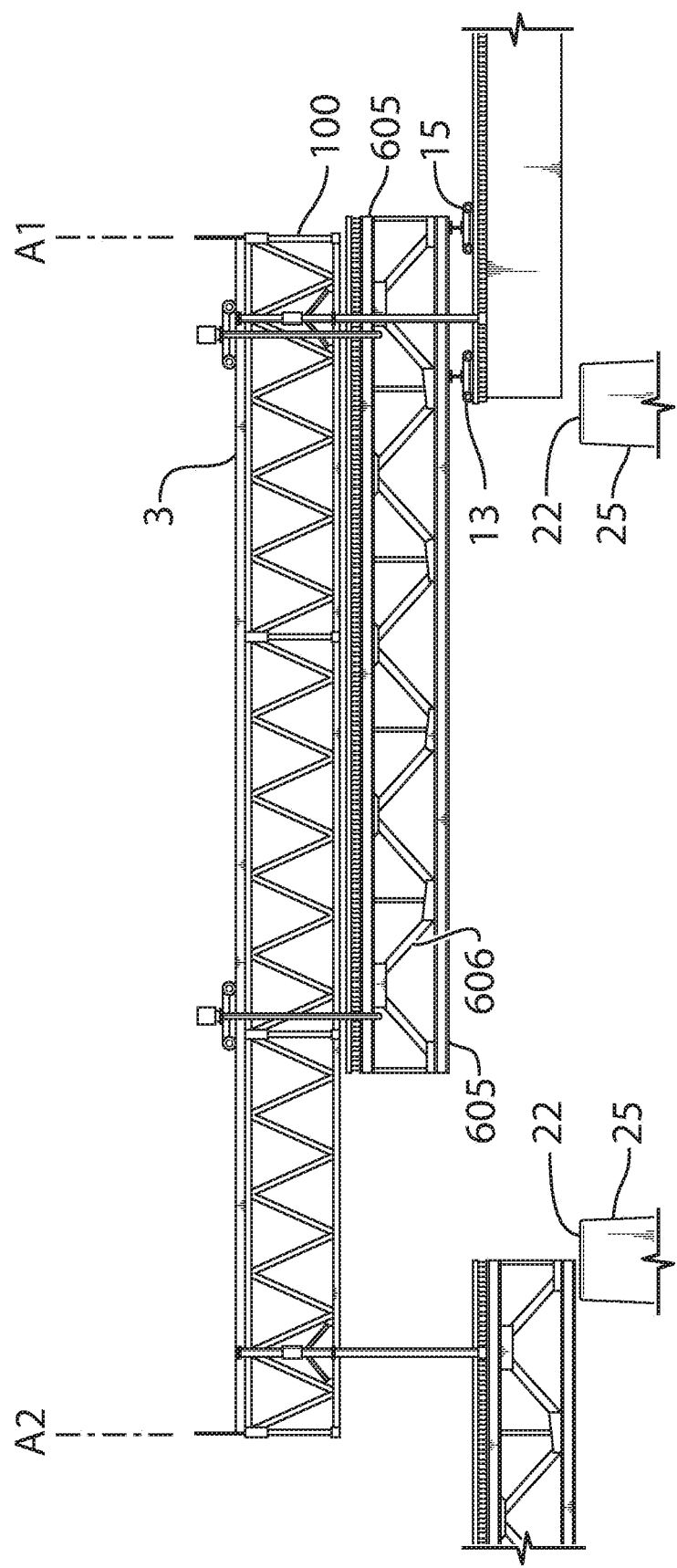
Figure 3D:
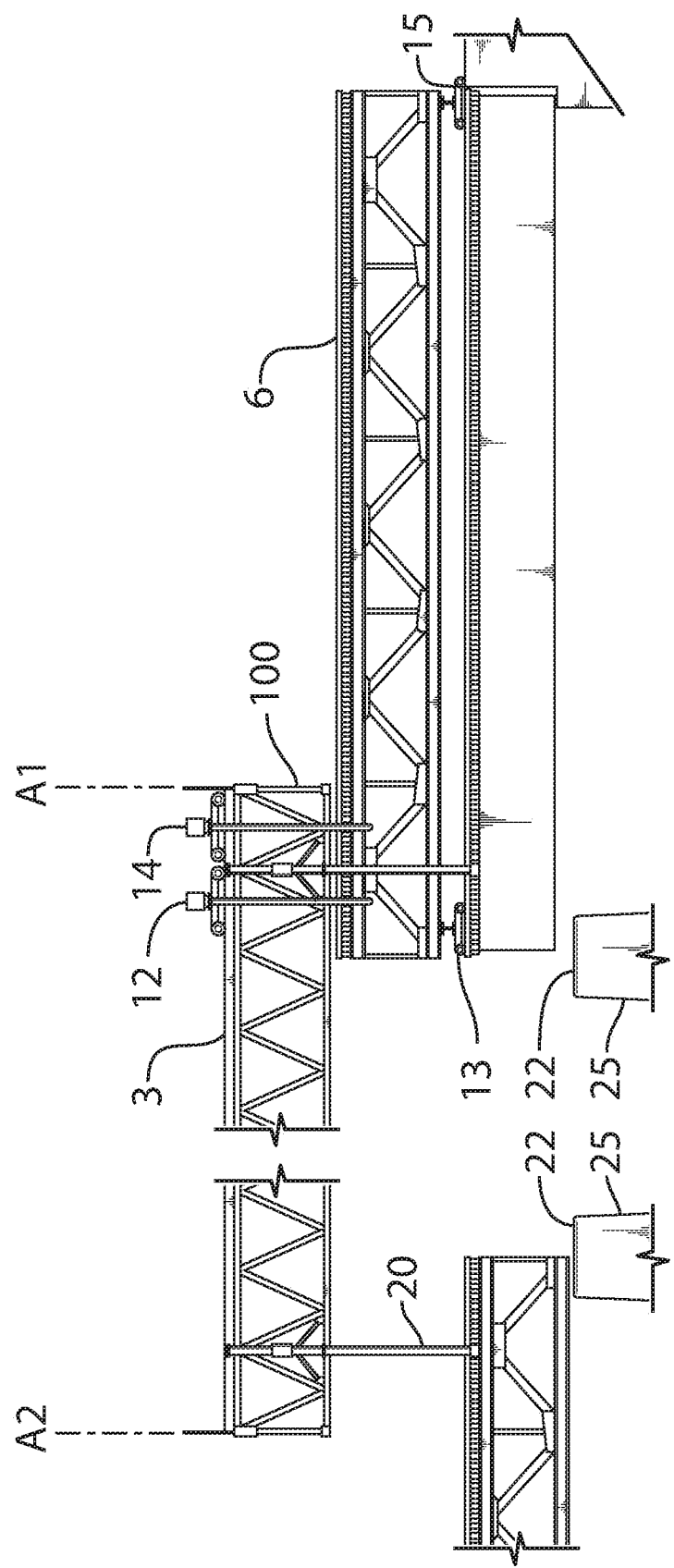
Figure 3E:
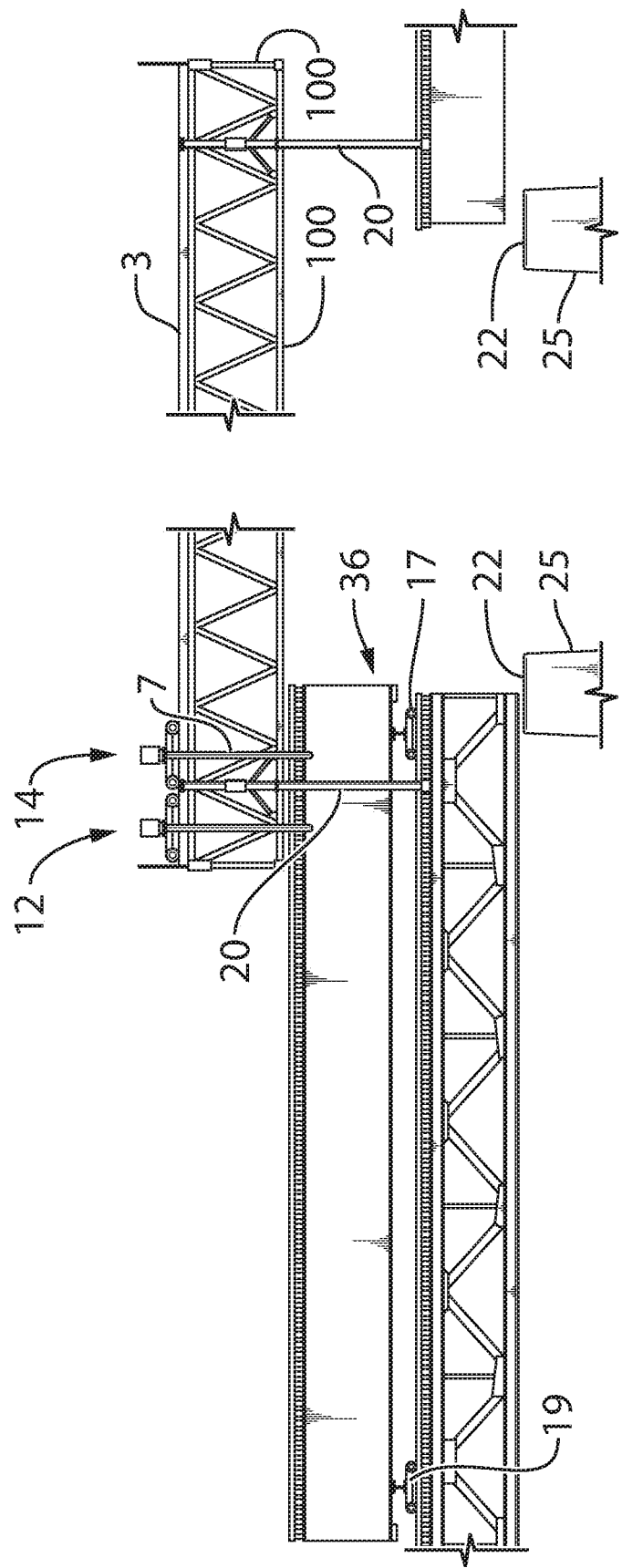
Figure 3F:
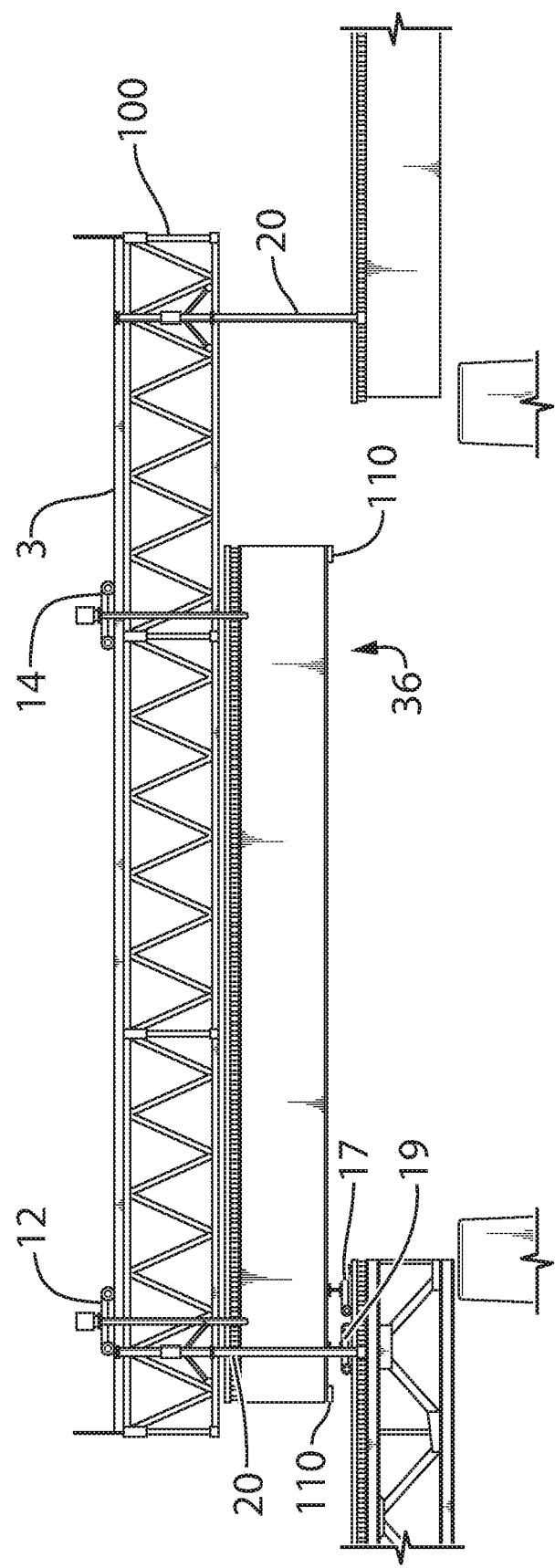
Figure 3G:
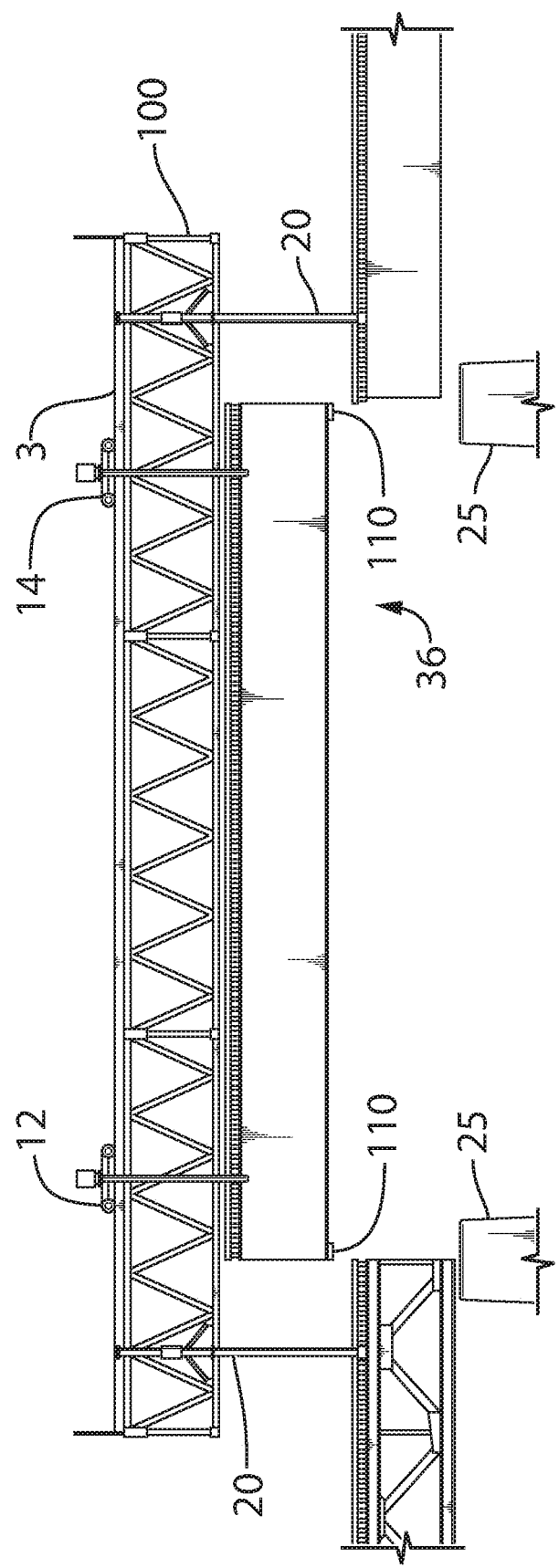
Figure 3H:
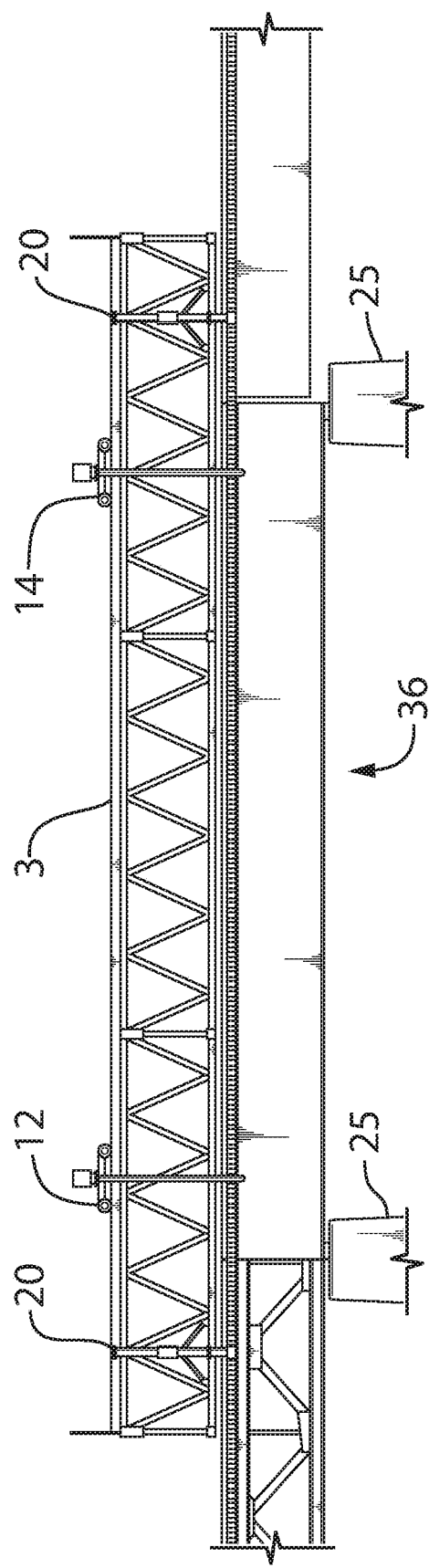

As seen in FIG. 1A, the gantry conveyance system comprises two independently locatable vehicles 12 and 14, each respective vehicle conveyable along the gantry 100 to a respective vehicle position limit and to a relative vehicle position limit (the vehicle closest to the end of the gantry interposes and defines a position limit for the other vehicle) defined by the relative position of the vehicles on either end of the gantry 100, separation of the vehicles towards the vehicle position limits adapted to suspend the bridge span from both ends of the gantry, as best seen in FIGS. 3B, 3F and 3G. As best seen in FIGS. 3D and 3E, to transfer the bridge span from the gantry conveyance system to the ground conveyance system, or vice versa, in a staged fashion, the vehicle separation is reduced. Analogously, where a first or second ground conveyance system consists of two rail cars, the distance between the rail cars varies according to the stage of load transfer.

A load-bearing gantry conveyance system 10, supported by the gantry 100, is adapted to independently support the weight of the bridge span 6, and configured for conveying a bridge span 6 in a substantially horizontal plane along the length of the gantry 100, movement of bridge span 6 relative to the gantry 100 via the gantry conveyance system 10 defining at least a first portion of a horizontal transport plane, the gantry conveyance system defining vehicle position limits in terms of theoretical position maxima including a forward vehicle position limit proximal to one end (a forward end) of the gantry 100 and rearward vehicle position limit proximal to the other end of the gantry 100.

According to one embodiment of the invention, the track 3 is secured to the gantry and is preferably brought onto the bridge span replacement site as part of the gantry assembly. Each vehicle (12, 14) comprises a spreader structure 16. The spreader structure 16 is oriented transversely with respect to the longitudinal axis of the gantry 100 for distancing two points of suspension of the bridge span from the center of gravity of a vehicle (12, 14). The spreader structure 16 is thereby configured to suspend a bridge span (6, 36) from two sides of the gantry 100.

Bridge spans vary in length. In this connection, it should be appreciated, that according to one embodiment of the invention described in most detail herein, a gantry 100 of approximately 150 feet length may be well suited to replace a bridge span (6, 36) of approximately 110 feet in length. For example, the outrigger portions 11A and 11B, are positioned at a distance from the end of the gantry (e.g. 10 feet from each end). The outrigger portions 11A and 11B block horizontal movement of the straps 7 in the process of conveyance of a bridge span in a horizontal transport plane organized to transfer of the load attributable to an end of the bridge span to or from the gantry conveyance system, since support points for the straps on the gantry conveyance system are above them. Therefore, while the size of the gantry, or the size track system (if more or less limiting) relative to the length of the bridge span, defines absolute vehicle position limits, in the embodiment described, the position of the outrigger portions relative to the end of the gantry practically define the vehicle position limits, since these positions may practically define relative vehicle positions determining the practical horizontal conveyance distances required for load transfer to (or from) the ground conveyance system.

Therefore, in our example of a gantry of 150 in length with the outrigger and leg portions spaced 10 feet from the end of gantry, the usable span of the track 3 may be 130 feet. Other factors that need to need to be taken into account in this regard are support positions of the straps relative to the end of bridge span, the positioning of the rail cars of the ground conveyance systems (limited by the ends of the track proximal to piers when an existing bridge span is lifted or absent) and the positions of the support surfaces of the rail cars relative to the positions of the gantry legs and the ends of the bridge spans. As a general rule of thumb, for removal of an existing bridge span, at a stage when the rail cars are positioned next to one another, the bridge span support surface of forward rail car should at least be able to be approximately aligned with the forward end portion of the bridge span e.g. when the bridge span is positioned at the strap position limit (a position that allows a rearward rail car to be positioned behind the forward rail car). Similarly, during installation of a new bridge span, the support portion of the rear rail car should be aligned with a rearward end of the bridge span which may require that the support portion be horizontally aligned with the gantry leg (a position that allows the forward rail car to be positioned in front of the rearward rail car).

Bridge Span Connection System

As best seen in FIGS. 1 and 5A-5C, according to one embodiment of the invention, a bridge span support system takes the form of bridge span suspension system. The bridge span suspension system takes the form of a bridge span connection system which comprises straps 7 which may be optionally looped to form slings.

Each end of the spreader structure 16 is displaced sufficiently from a center of gravity of a vehicle (12, 14) to define a line of sight between a respective end of the spreader structure 16 and a point of contact or connection of the strap 7 to the bridge span, the spreader structure 16 optionally sized to exceed the width of the gantry 100 (e.g. approx. 7 ft. plus)

Each end of the spreader structure 16 is operatively associated with a connector for connecting a strap 7, the connector optionally in the form of a shackle 900 which may be rotationally mounted. The distance between the connectors 900 is longer than the width of the gantry 100. Optionally, there are also connectors in the form of shackles (optionally rotationally-mounted) on the bridge span (not shown). Rotationally-mounted connectors 900 are optionally configured to permit the sling arm to have play in plane parallel to longitudinal axis of the gantry (e.g. the connector is mounted for rotation about an axis perpendicular to the longitudinal axis of the gantry). The straps 7 are adapted to suspend a bridge span 6 beneath the gantry 100 (they are long enough so that the bridge span clears lower edge of gantry 100 which defines the upper limit of the horizontal transport plane, the horizontal transport plane also having a lower limit defined by the height of the support bed of the ground conveyance system).

Ground Conveyance System and Load Transfer

A load-bearing, ground engaging, first ground conveyance system 26 is adapted to be positioned on load-bearing second ground-support locations in the vicinity of the bridge-span support surface of a forward pier 25, the ground conveyance system adapted to be driven on a path preferably defined by a train track 24, the path defining a horizontal displacement distance which extends a forward vehicle position limit on at least a first side of the gantry 100 by a distance sufficient to transfer full load support from the gantry conveyance system 10 to the ground conveyance system 26, the ground conveyance system 26 optionally including a forward rail car 15 and rearward rail car 24 each having a support portion 8 for supporting the weight of a bridge span 6. The vertical support system and lift system is adapted to raise the gantry 100 to a height in which the lower limit of the first horizontal transport plane is above and clears the support portion 8 of the ground conveyance system 26, such that the train bridge span 6 can be conveyed by the gantry conveyance system 10 into horizontal alignment with a load transferring first position overlying support surfaces 8 of the ground conveyance system, and received for support on the support surfaces 8 of the ground conveyance system 26 for conveyance through a horizontal displacement distance, optionally using the vertical support and lift system to lower the bridge span 6 on the ground conveyance system 26.

The outrigger portion 11 is configured to laterally displace a leg portion from lateral perimeters of the gantry 100, the lateral displacement accommodates passage of bridge span 6 between the leg portions 20 of the first and second vertical support assemblies (2, 29) to enable load transfer from the gantry conveyance system to the ground conveyance system and vice versa.

As shown in FIGS. 3B to 3D the track 3 defines a forward vehicle position limit A1 at a first end thereof and a rearward vehicle position limit A2 at a second end thereof. The ground conveyance system extends the horizontal transport plane so that the existing bridge span can be transferred from the gantry conveyance system to the ground conveyance system.

As shown in FIGS. 1 and 3B-3D a ground conveyance system comprising a forward rail car 15 and a rearward rail car 13 may be used in conjunction with the gantry conveyance system to convey an existing bridge span from a position above the piers with partial load support from forward rail car 15 supporting a forward end of the existing bridge span and partial load support from the rearward vehicle 13 supporting a rearward end portion of the existing bridge span as described below.

As shown in FIGS. 1 and 3B-3D, the forward vehicle 14 is positioned on the track in a position more proximate to the direction of removal of the existing bridge span 6 or installation of a replacement bridge span 36, assuming the replacement bridge span 36 is launched from the same direction to the one in which the existing bridge span is removed (i.e. from the opposite side of the gantry installation). It will be appreciated that a replacement bridge span may be launched from the opposite direction to the one in which the existing bridge span is removed (i.e. from the same side of the gantry installation). It will also be appreciated that installation of the gantry according to the particular method described herein requires an existing bridge span or surrogate to effect a gantry installation using a pre-installation conveyance system.

As seen in FIGS. 1A and 3E-3F, a load-bearing second ground conveyance system 21 is used to install a replacement bridge span 36, the second ground conveyance system 21 optionally including a forward rail car 17 and rearward rail car 19 positioned on load-bearing third ground support locations in the vicinity of the bridge span support surface of pier 25, the forward rail car 17 positioned more proximal to the gantry assembly 1.

Optionally, referring to FIGS. 3B to 3D, the track 3 is sufficiently long to allow the forward end portion of the bridge span 6 to be horizontally aligned with the forward rail car 15 (in principle, the forward vehicle 14 need not be positioned as far forward as the forward rail car 15) so that the load corresponding to the forward end of the existing bridge span can be transferred from the forward vehicle to the forward rail car (having regard to relevant parameters such as the proximity of the point of attachment of the load-bearing strap(s) to that end of the bridge span, relative positions of the first and second ground-support locations and the length of a vehicle and rail car).

Similarly, referring to FIGS. 3E to 3G, when a replacement bridge span 36 is brought in from an opposite side of the gantry installation, the relative vehicle position limit of the forward vehicle 14 (taking in account the space on the track occupied by the rearward vehicle) allows the forward end portion of the replacement bridge span to be positioned substantially over the forward rail car 15 of the fourth conveyance system.

This length of track preferably allows the rearward end portion of a bridge span to occupy a position over the rearward rail car 19 of the second ground conveyance system (taking into account the position of the strap relative to the rearward end portion of the replacement bridge span) so that the portion of the load attributable to the rearward end of the bridge span can be transferred from the rearward vehicle 12 to the rearward rail car 19. Optionally, the usable portion of the track (defining vehicle position limits, as well as relative vehicle position limits i.e. the forward-most position of the rearward vehicle at the forward end of the track) may be approximately as long as the gantry and may also be selected so that both the forward and rear rail cars can be positioned underneath the track (it will be appreciated that relative position limits may be defined in terms the length of the forward vehicle as well as a modest amount of space that is maintained between the vehicles and between the forward vehicle position and the forward position limit). In this regard, it will be appreciated that the points of attachment of the straps proximal to an end portion of the bridge span may be selected to be a certain distance from end of the bridge span and that the bridge span may not be supported by a rail car at its very end.

The undersurface of the end of a bridge span 36 may be adapted for support on a rail car and/or on the bridge span support surfaces of the adjacent piers (see support portion 110—FIG. 3F).

Gantry Assembly Installation

By way of overview, as seen in FIGS. 1A and 1B, illustrating a simplified view of an embodiment of a gantry assembly installation, in addition to a gantry assembly 1 described in detail below, such an installation optionally initially comprises at least a portion of a gantry conveyance system 10 in the form of a track 3 belonging to a track system supported by the gantry 100. Optionally, vehicle(s) 12 and 14 may be supported on the track 3 when the gantry assembly 1 is initially brought to the work site.

Furthermore, by way of overview, as best seen in FIGS. 1B and 3B, a ground conveyance system 26 may be positioned at load bearing second ground-support locations proximal to the area overlying bridge span support surfaces 22 of piers 25. The bridge span support surfaces 22 of the piers 25 are typically below track level. A train track support substructure of a bridge span 6 may typically have a series of beams 605 connected at spaced junctions by struts 606 attached to the beams 605, the points of attachment of the struts to the beams exemplifying ideal first, second and third load bearing ground-support locations for a supporting a gantry assembly installation.

The outrigger portion 11 is configured to position the leg portions 20 perpendicularly to the gantry 100 outside the footprint area of the first ground conveyance system with the ground engaging leg portions 20 overlying the first ground support locations such that when the gantry 20, vertical support system (2,29) and lift system are operatively connected on the pre-installation conveyance system 27 and the pre-installation conveyance system 27 is transported into horizontal alignment with the first ground support locations, the lift system can extend the leg portions 20 thereby lowering the ground engaging portions 49 of the leg portions onto the first ground support locations to lift the gantry 100 off the pre-installation conveyance system 27 and effect a gantry installation, the vertical positions preferably including a vertical position of a height sufficient for the pre-installation conveyance system to be removed from or repositioned beneath the gantry assembly installation, optionally, for re-use in or as or as part of a ground conveyance system.

Optionally, the lift system of the vertical support and lift system is a hydraulic lift system. Optionally, each vertical support assembly (2, 29) comprises two hydraulically extendible leg portions 20 whereby the effective linear vertical distance between the ground engaging portion of each gantry leg portion and the gantry is adapted to be hydraulically varied by the lift system. As described herein, the leg portions 20 are optionally connected to the gantry 100 via an outrigger portion 11 such that the hydraulic leg portions 20 of the vertical support assemblies 2 and 29 are laterally spaced apart to an extent accommodating extension of the hydraulic legs to clear the lateral perimeters of the pre-installation conveyance system 27 to effect a gantry installation from off the pre-installation conveyance system (directly from a position in which the gantry assembly 1 rests horizontally on the pre-installation conveyance system 27). Preferably, the leg portions 20 of both vertical support assemblies 2 and 29 are laterally spaced apart to an extent permitting horizontal movement of the train bridge spans 6 and 36 between them so as to enable the first and second ground conveyance systems to work from opposite sides of the gantry assembly 1. Optionally, this lateral distance is greater than the width of the rail cars of the pre-installation conveyance system. It will be appreciated that the pre-installation and ground conveyance systems may share rail cars. The numbering (i.e. first and second) used for the conveyance systems is not meant to imply that rail cars must be allocated to one conveyance system to the exclusion of another where sharing of rail cars is practical.

As best seen in FIGS. 5A and 5B the lateral perimeters of the gantry assembly footprint lie adjacent to the lateral perimeters of the support bed 800 of a rail car 28 of the pre-installation conveyance system 27 when the gantry assembly in supported on the pre-installation conveyance system 27 in the stowed position (5A). Optionally, the lateral perimeters of the gantry assembly lie within the lateral perimeters of the footprint area of the pre-installation conveyance system.

As best seen in FIGS. 1A and 1B and FIGS. 5A, 5B and 5C, leg portions 20 of the vertical support assembly are adapted to be contracted or shortened by the lift system to occupy a compact configuration which is optionally, beneath, at or above the height of the support platform of the pre-installation conveyance system when the gantry assembly is supported on the support platform in the stowed position. Extension of the gantry legs onto first ground locations may require the ground locations to be adapted for load support. For example, a ground engaging load bearing support beam 9 may be installed over load supporting ground material at ground locations corresponding to planned ground positions of ground engaging portion(s) of the vertical support assemblies 2 and 29. For example, the support beams in the form of beam assemblies 9 may be supported on same ground material that the railroad ties are supported on (e.g. track ballast comprising coarse aggregate; a structure associated with an adjacent bridge span etc.) under portions of a train track leading respectively to and from an existing bridge span. The support beams may be positioned to have a top-surface height which provides load-bearing support to the under-surface of train-track rails proximal to the first ground locations and may be supported at ground locations at least partially formerly occupied by railroad ties. Thus installing a gantry assembly may involve advance removal of existing railroad ties and their replacement by a support beam optionally in the form of middle portion 9B of beam assembly 9 (see FIG. 1B).

It is noteworthy, that the lateral span of the outrigger portions 11, when rotated into the installation position, may exceed the lateral dimension of the railroad ties and the lateral span of supporting ground material such that the ground engaging portions of leg portions 20 may be positioned outside the available ground support area adjacent to the first ground locations. Particularly in the case of a train bridge spanned by multiple piers and bridge spans, replacement of a bridge span interposed between two others may require the first ground locations, optionally represented by the ends 9A and 9C of a beam assembly 9, to overhang the available contiguous ground support material. The first ground locations may therefore be 'manufactured' and installed in advance and/or as part of a gantry assembly installation process for example by employing a three section beam as shown in FIG. 1B and best seen in FIGS. 5A, 5B and 5C. In particular, end portions 9A and 9C of the support beam may be carried on site suspended from the gantry legs and then fastened on the middle portion 9B of support beam assembly 9 as seen in FIG. 1B. Portions 9A and 9C may be removed from ground engaging portions 49, fastened onto portion 9B (see FIG. 1B) and then ground engaging portions in the form of foot portions 49 are securely fastened onto portions 9A and 9C respectively. Alternatively, when the gantry assembly is transported by a pre-installation conveyance system 27 into alignment with first ground support locations, the gantry leg portions 20 may be extended as particularly required to vertically align beam portions 9A and 9B with 9C with the aid of abutment portions 40 so that beam portions 9A and 9C can be fastened onto portion 9B while the weight of the gantry assembly is still borne by the pre-installation conveyance system. Accordingly, according to one embodiment of the invention, the leg portions of each vertical support assembly may include or may be adapted to be operatively associated with a vertical alignment means, for example, a descent-arresting abutment or stop means, for example a laterally projecting abutment portion 40 for aligning the overhang portions of a support beam 9A and 9C with a ground-supported portion 9B, for example, flange or plate 40 which extends laterally inwardly from portions 9A and 9C in the course of being lowered. The overhang portions 9A and 9C of an overhang ground support system are adapted to be attached e.g. by fasteners, to a ground-supported portion of a ground support structure in the form of beam portion 9B. These overhang portions 9A and 9B and are optionally adapted to be secured e.g. by fasteners, to the foot portions 49 of the leg portions 20. The ground-supported portion 9B is optionally similarly adapted. Therefore, the ground engaging portions 49 of the leg portions 20 are adapted for use with an overhang ground-support system.

Method

According to one embodiment of the invention, the method comprises, as best seen in FIGS. 2 and 5C:

using a pre-installation conveyance system 27 including at least one rail car 28 to convey a gantry assembly 1, preferably supported in a substantially horizontal position, into horizontal alignment with a plurality of load-bearing first ground-support locations, wherein the gantry assembly 1 overlies an existing bridge span 6; and controlling the vertical support and lift system to lift the gantry assembly 1 off the pre-installation conveyance system 27 to effect a gantry assembly installation.

This makes it possible to remove or re-position rail cars 28, and as necessary secure the ground engaging portions of the leg portion 20 to support surfaces e.g. tie beams 9, at the first ground-support locations.

Optionally, at least one component of the pre-installation conveyance system 27 e.g. rail cars are reused as part of a ground conveyance system 21 and/or 26. For re-use the position of the rail cars 28 may need to be adjusted to be positioned at second and/or third ground support locations. Alternatively they are removed from beneath the gantry assembly 1. Locomotive 770 may remain on-site to transport an existing bridge span 6 away from the work site.

In connection with removing or repositioning the pre-installation conveyance system 27 from beneath the gantry 100, where the lateral perimeters of the pre-installation conveyance system 27 are wider that the gantry, the gantry assembly 1 is configured so that the ground-engaging portions of the leg portions 20 are suspended outside the lateral perimeters of the pre-installation conveyance system footprint so as to provide lateral clearance for the ground engaging portions to be extended onto the first ground-support locations and for the pre-installation system to be removed/repositioned from beneath the gantry 100. As described above with reference to FIGS. 4A-4B and 5A-5C this is accomplished, according to one embodiment of the invention, by rotating the outrigger portions 11A and 11B from a stowed position into an installation position and securing the outrigger end plates 610 to another portion of the gantry connection portion, for example a mating end plate portion 615, which is securely fixed to the gantry or at least adapted to be securely fixed in a position to provide the necessary support and stability.

According to one embodiment of the method, defined in terms of positioning of vehicles 12 and 14 of the gantry conveyance system 10 and the at the least one rail car of the ground conveyance system 26, it is key that the gantry conveyance system 10 and bridge span connection system are adapted for horizontally conveying a raised existing bridge span in a horizontal transport plane over distance sufficient to transfer a load corresponding to the weight of the existing bridge span 6 in at least one stage onto a support portion of a ground conveyance system 26.

The method further comprises (see FIGS. 3A and 3B):

bringing a ground conveyance system 26 into horizontal alignment with load-bearing second ground-support locations in which the ground conveyance system 26 is positioned on a path defined by a portion of a train track contiguous with the train track overlying the existing bridge span;

adjusting the height of the gantry 100, if necessary, connecting the bridge span connection system in the form of straps 7 (optionally looped to form a sling) between the bridge span 6 and the gantry conveyance system 10, such that the bridge span 6 is prepared to be suspended from the gantry conveyance system 10 when the gantry 100 is lifted by the vertical support and lift system into the at least one horizontal transport plane;

Controlling the vertical support and lift system to raise train bridge span 6 into the least one horizontal transport plane;

Using the gantry conveyance system 10 to convey the bridge span 6 into at least one load transferring position overlying a support portion of the ground conveyance system (see FIG. 3C), the load transferring position adapted for transferring a load corresponding to the weight of the bridge span from the gantry conveyance system 10 to the ground conveyance system 26; and Transferring a load, corresponding to the weight of the bridge span 6, from the gantry conveyance 10 to the ground conveyance system 26 (optionally vehicles 13 and 15), the control system controllable to lower the existing bridge span 6 onto the support portion 8 of the ground conveyance system 26 (see FIG. 3D).

The latter steps, described in general terms may be accomplished, according to one embodiment of the method, as follows:

the gantry conveyance system 10 is used to convey the bridge span 6 towards a vehicle position limit into a load-transferring first position overlying the ground conveyance system 26 to transfer the load attributable to a forward end portion of the bridge span to the ground conveyance system 26, whereupon the ground conveyance system 26 in combination with the gantry conveyance system 10 are used to convey the train bridge span beyond the vehicle position limit to a load transferring second position in which the load attributable to a rearward end portion of the existing bridge span is transferable to the ground conveyance system and a load attributable to the rearward end-portion of the existing bridge span 6 is then transferred to the ground conveyance system 10, such that the existing bridge span 6 is removable from the work site.

More particularly, the gantry conveyance system may include a hydraulically powered forward vehicle 14 and a hydraulically powered rearward vehicle 12 riding on a track 3 of the track system and the ground conveyance system may comprises a forward rail car 15 and a rearward rail car 13, each rail car having a bridge span support bed 8, wherein in operation:

the existing bridge span 6 is raised into the at least one horizontal transport plane by actuation of the vertical support and lift system and transported in a horizontal plane by the forward vehicle 14 and rearward vehicle 12 until the forward vehicle 14 approaches a forward vehicle position limit in which the existing bridge span is positioned above the support bed of the forward rail car 15, whereupon a portion of the load attributable to the forward end portion of the existing bridge span 6 is then transferred onto the forward rail car 15, optionally by using the lift system to lower the gantry 100; and wherein the existing train bridge span 6 is then conveyed toward a full ground support position with at least partial support from the forward rail car 15 supporting a forward end portion of the bridge span 6 and the rearward vehicle 12 supporting a rearward end portion of the bridge span 6 until the rearward end portion of the bridge span is positioned above the support bed of the rearward rail car 13, whereupon the load is transferred onto a support bed of the rearward rail car 13 preferably by using the lift system to lower the gantry 100.

Replacing the existing bridge span 6, with a replacement bridge span 36, as shown in 3E to 3H, optionally involves the following general steps:

Using a second ground conveyance system 21 optionally comprising rail cars 17 and 19 to convey a replacement bridge span 36 into alignment with load bearing third ground-support locations corresponding to portions of a train track leading to the rearward pier at which at least a forward end the replacement bridge span 36 is positioned under the gantry conveyance system 10;

Transferring a load attributable to at least a forward end portion of the replacement train-bridge span 36 to the gantry conveyance system 10 (e.g. vehicles 12 and 14) and a bridge span connection system including straps 7;

Using the gantry conveyance system 10 and the second ground conveyance system 21 (e.g. vehicle 19) to convey the replacement bridge span 36 into horizontal alignment with a third ground-support location in which a rearward end portion of the replacement bridge span 36 is positioned under the gantry conveyance system and transferring a load attributable to the rearward end portion of the replacement train-bridge span to the gantry conveyance system 10 and the bridge span connection system;

Using the gantry conveyance system 10 and bridge span connection system to convey the replacement bridge span 36 into horizontal alignment with bridge span support-surfaces 22 of the piers 25;

using the vertical support and lift system to lower the replacement bridge span 36 onto the bridge span support-surfaces 22 of the piers 25.

More particularly, the gantry conveyance system may include a forward vehicle 14 and a rearward vehicle 12 riding on a track 3 and the ground conveyance system comprises a forward rail car 17 and a rearward rail car 19, each rail car having a bridge span support bed, wherein in operation:

Using the forward rail car 17 and a rearward rail car 19 to convey a replacement bridge span 36 into alignment with load bearing third ground-support locations in which a forward end the replacement bridge span 36 is positioned under the forward vehicle 14;

Transferring a load corresponding to a forward end portion of the replacement bridge span 36 to the forward vehicle 14 and the bridge span connection system;

Using the forward vehicle 14 in conjunction with the rearward rail car 19 and the bridge span connection system to convey the replacement bridge span 36 into horizontal alignment with a third ground-support location in which a rearward end portion of the replacement bridge span 36 is positioned under the rearward vehicle 12 and transferring a load attributable to the rearward end portion of the replacement train-bridge span from the rearward rail car 19 to the rearward vehicle 12 and bridge span connection system;

Using the forward vehicle 14 and rearward vehicle 12 in conjunction with the bridge span connection system, to convey the replacement bridge span 36 into horizontal alignment with bridge span support-surfaces of the first and second piers; and Using the vertical support and lift system to lower the replacement bridge span onto the bridge span support-surfaces of the first and second piers.

Subsequently the bridge span connection system including straps 7 are removed from the replacement bridge span 36; and Again, adjusting the height of the gantry, as necessary, conveying a post-installation conveyance system including a support bed configured to support the gantry installation under the gantry assembly installation and using the lift system to lift the ground engaging portions 49 of the vertical support system from the first ground-support locations such that the weight of the gantry assembly 1 is transferred onto the post-installation conveyance system (not shown); and transporting the gantry assembly 1 away from the replacement bridge span.

Optionally, the method is executed according to a schedule that accommodates a scheduled maximum delay of train traffic across the train bridge (e.g. 6 to 16 hours), the path at least of sufficient length to convey the existing bridge span to a site for off-loading the existing bridge span.

Optionally, a combined footprint of the pre-installation conveyance system 27 and gantry assembly 1 supported thereon is accommodated by an existing train route for bringing the gantry assembly 1 onto a gantry installation worksite including through or via any train tunnel, train track or train station along the existing train route.

Optionally, a combined footprint of the post-installation conveyance system and gantry assembly supported thereon is accommodated by an existing train route for bringing the gantry assembly off a gantry installation worksite and optionally onto a new gantry installation worksite including through or via any train tunnel, train track or train station along the existing train route.

Definitions

The phrase "horizontal alignment" means positioning on or with reference to a horizontal surface or the x-y coordinates of a horizontal plane, as opposed to with reference to a vertical position, such that the gantry assembly, for example, is positioned correctly to align with positions on, along or adjacent to a path of travel, so that, for example, it is spaced correctly with respect to prepared support structures such as a tie beam and/or the piers and/or is otherwise preferred e.g. for load support e.g. placement at the point of greatest load tolerance e.g. the juncture of two diagonally positioned struts or overlying an area proximal to a vertical strut).

The term "horizontal" means "functionally horizontal" as appreciated by persons skilled in the art having regard to any impact on stability with reference to context e.g. motion (transport plane) or stationary (e.g. support).

The term "end" as used herein, primarily to refer to the end of a gantry, a track system or track or a bridge span. This term means an 'end portion' of the structure in question, such that any support provided, leverage gained or strength feature etc. achieved at or from the end portion, yields a useful practical mechanical advantage, self-evident design choice or other intuitive benefit, for the purposes of the invention, as understood, in context, by persons skilled in the relevant arts. Hence, in practical contextual terms, "end" would not be understood to be limited to the geometric or linear end of the structure unless a person skilled in the art would consider implementation from a geometric end to be intended having regard to practical, predictable design considerations.

Similarly the term "proximal" means "functionally proximal" and in effect connotes a distance or nearness aspect which for practical purposes is useful for realizing any purpose of the "proximity" (similarly understood, in context, from the standpoint of achieving any practical mechanical advantage, design choice or other evident organizational benefit). For example, supporting a bridge span "proximal" to an end thereof would be understood to encompass a practical range of locations on the bridge span having regard to support considerations as well as the consequent horizontal distance over which the bridge span would have to be transported to transfer the load attributable to an end portion of the bridge span from the gantry conveyance system to the ground conveyance system. For example, this distance would be longer if the rigging suspending the bridge span was attached to the bridge span closer to the end thereof. Similarly, this distance would be shorter if the very end of the bridge span was brought to rest on a rail car of a ground conveyance system, as opposed to a portion more remote from the end.

The term "forward" when used to describe a rail car (first or second ground conveyance system) or a support member, suspension means or vehicle (gantry conveyance system) or an end of a gantry, gantry assembly, or bridge span, refers to that which is "leading" in the intended direction of transport. Similarly, the term "rear" or "rearward" refers to that which is "trailing". It will be appreciated that the direction of transport, for convenience, may be the same for removing an existing bridge span and bringing in a new or replacement bridge span from the opposite side of a bridge, however, as suggested herein, in certain circumstances wherein the existing bridge span can be off-loaded or removed from the railway relatively quickly, removal of the existing bridge span and installation of a replacement bridge span may be done from the same side of the bridge (i.e. the direction of transport would be different).

The term "securely" used with reference to positioning of the ground engaging portions of the leg portions of the vertical support and lift system at the first ground locations, means that the ground engaging portions are at least operationally constrained from moving in a horizontal plane so as to resist movement out of position and buckling.

The term "separately locatable" means that a component in question can be separated, by a plurality of fixed distances or by a variable (continuous) distance from the remainder of a system or another component of the system such that it can, at least operatively, be positioned independently. With respect to the gantry conveyance system, the phrase "separately locatable" implies that the vehicles can at least be separated to varying degrees but does not imply that they necessarily have independent methods of propulsion and that the vehicles have no common portions. Optionally, the component in question e.g. a vehicle, is unassociated i.e. completely independent e.g. of a second vehicle ("independently locatable"). By contrast, the term "independently locatable" further implies that the vehicles are fully independent in a sense including being unlinked, independently controlled and driven by separate propulsion sources (despite being functionally inter-dependent) for example, separate connection lines to a single or two hydraulic power units It will be appreciated that the strategy of having a pair of horizontally movable points of support e.g. suspension which are separately or independently locatable" potentiates, at least in theory, "maximal" rearward movement of a forward point of support e.g. suspension (e.g. for conveying a new bridge span into position) and "maximal" forward movement of rearward point of support e.g. suspension (e.g. for removing an existing bridge span) enabling the bridge span to be supported e.g. suspended proximal to its ends.

It will be appreciated that two separately locatable points of suspension may be conveyable, for example in a load-moving sense, in tandem, for example by providing connection points at spaced positions by which they become temporarily fixed to move together so that in principle only although both suspension means need to be conveyable at least a passive sense if not actively (under some form of power) only one vehicle is needed for moving the load on the gantry conveyance system. Optionally both suspension means are conveyable under some form of power system, optionally both are sufficiently powered to move at least half of a load corresponding to the weight of a bridge span.

The term "path" means any demarcated or non-demarcated area which is or is subject to being cleared to allow movement or transport.

The term "gantry conveyance system" is used to refer a conveyance system supported on the gantry.

The descriptors "first" and "second" as applied herein to ground conveyance systems used in conjunction with the gantry conveyance system, are used to refer to a system for removal of an existing bridge span and a system for installation of a replacement bridge span, respectively. It will be appreciated that the at least one rail car used as part of a ground conveyance system for removing an existing bridge span may be reused on the same side of the gantry installation to install a replacement bridge span provided that the rail car(s) is/are able to be freed up for this purpose in a practical time frame. Irrespective of which rail cars are being used, the same side of gantry may be used for both removal and installation of a bridge span provided that the accommodating portion of track proximal to the pier in question can be accessed in a practical time frame for both activities. Subject to the proviso that an existing bridge span is assumed to be available for installing a gantry assembly, the invention, is not limited to the combined activities of removal and replacement of a bridge span and may reside in either one of these activities independently as well as in preliminary steps involved in installation of a gantry assembly for either purpose. It will also be appreciated that the invention herein has application to installation of a gantry assembly for removal or installation of any type of bridge span.

The term "strap" means a length of material or connected materials of sufficient length, strength, and rigidity or flexibility (from an engineering and safety standpoint) to serve the function of supporting such part of the weight of bridge span as is demanded by the context in which the strap is being used. The term strap includes, without limitation, webbing and a cable. The webbing or cable optionally has a weight load limit of 50 tons. The term suspension means is used to refer to a conveyable means for suspending the bridge span, a means which serves a conveyance function and an attachment function. Optionally, the attachment function is accomplished by a length of material (e.g. a strap) of predetermined operational length i.e. in principle, the length is not varied in the course of operation to lower and raise the bridge span in the fashion of a typical winch. In this connection, it is noteworthy that the term "lift" as used in the context of a 'vertical support and "lift" system', connotes raising and lowering functions depending on the particular stage of the bridge span replacement process. Accordingly, the term "bridge span connection system" is used to preferentially describe a length of material of predetermined operational length.

The term "sling" is used in broad functional terms to define parallel straps or portions of a strap wherein the strap material is integrally looped or connected to form a loop.

The term "rail car" includes any track engaging vehicle that is either propelled (pushed or pulled) by another vehicle, such as a locomotive, or that is self-propelled, and preferably has a footprint adapted to navigate through standard railway routes that lead to and from railway bridges of the type that might require bridge span replacement for example a lateral span of 5-14 feet, optionally 5 to 12 feet, for example 6 to 10 feet.

In connection with a train car or rail car, the term "support platform" when used to describe a support portion of the car for a gantry or gantry assembly is used to mean any type of load bearing surface used to support the weight of the gantry/gantry assembly. The term support platform is also used broadly to refer to a support bed constituted by complimentary surfaces of two cooperating rail cars.

The term "gantry" is a term of art and is broadly used herein to refer to an elongate (optionally overhead) structure (generally understood to employ conventional structural elements such as plates, struts, cross bars, beams etc. to garner strength while reducing the weight of the structure) which includes or is operatively connected to an equipment-supporting sub-structure, for example, a sub-structure in the form of a platform or rails that support equipment, the equipment according to the invention herein comprising at least one vehicle of a gantry conveyance system, for example a vehicle propelled by an external power system or a self-propelled vehicle. In the context of a system or installation according to the invention as herein defined, the gantry is a horizontally positioned bridge span support structure that is supported by a support system e.g. vertically oriented legs that are operatively associated with a lift system which vertical adjusts (i.e. raises and lowers) the height of the gantry so that the gantry together with a bridge span suspended underneath it, can occupy a plurality of vertical positions (e.g. height-adjusted substantially horizontal planes) such that an existing bridge span can potentially be lifted off bridge-span support surfaces of two contiguous pier structures and a new bridge span lowered in its place.

The term "ground-support", understood from the standpoint of providing load-bearing support for a gantry assembly, or a first or second ground conveyance system, is broadly understood to mean, in contradistinction to support provided from the gantry, a load bearing ground-supported surface located at a height that is proximal to the height of the bridge span support surfaces of the piers of a bridge (in need of span installation or replacement), optionally in the case of a train-bridge at or near track level. The invention contemplates that the ground support for the equipment required to replace a bridge span is essentially at "ground level" as defined herein i.e. roughly at bridge-height level. The invention contemplates that the ground support is provided by the piers or from the surface of the ground leading to or from the bridge (approximately bridge height and not from the level at which the piers are supported). In principle, the direct support may include any structure (apart from the gantry) directly or indirectly supported on the ground area leading to or from the bridge at which at least one bridge span is intended to be replaced or on a support surface directly or indirectly supported on or constituted by the bridge piers located at the bridge in question. Indirect support may be provided by any load-bearing platform, pier, slab, beam or other support defining surfaces (vehicular or stationary), which are in effect supported on the ground, optionally at ground-level, optionally on ground material, optionally more proximal to the ground than the vertically elevated horizontal transport plane provided by the gantry conveyance system, for example, support surfaces of a rail car or other vehicle of the type more directly and proximally supported on the ground. Therefore, for example, without limitation, particularly in the context of the phrase "first ground-support locations" which provide support for the gantry assembly leg portions, these locations may be a surface of a beam or a portion of a beam that laterally overhangs an adjacent bridge span, the adjacent bridge span providing ground support for the overhanging support portions of the support beam. Thus, the term "first ground-support locations" includes theoretical locations prepared for supporting a gantry installation either in advance or as part the essential installation process. For example, the term "first ground-support locations": encompasses terrestrial (directly or indirectly supported on the ground) or track-level aerial locations (e.g. overhang positions) in which primary or supplementary ground-associated support material remains to be physically installed, for example prior to and/or in the process of final positioning the gantry legs. As described below, first ground support locations are exemplified by portions 9A and 9C of a beam assembly that are optionally pre-fastened or temporarily fastened onto the ground engaging portions of the gantry legs, as described below, and subsequently fastened onto an earlier installed tie beam portion 9B which may positioned in place of a standard railway tie prior to bringing a gantry assembly to the bridge span replacement site (alternatively called a "work site" or "installation site").

In terms of "ground-support", it will be appreciated that a support bed defined by support portions of a single or linked rail cars (not separated in operation) of a first ground conveyance system may be considered to provide "ground support" for some form friction-reduced horizontal conveyance of a bridge span to load a bridge span onto the rail car, such as to obviate the need to employ a pair individually locatable rail cars. For example, the bridge span itself or a support bed of the car may be outfitted with a form of slidable, rollable or otherwise friction-reduced means of facilitating horizontal travel so that a single or linked rail cars (e.g. having a bridging platform) can receive the bridge span incrementally. Similarly, the second ground conveyance system or a replacement bridge span may be outfitted with a form of slidable, rollable or otherwise friction-reduced means of horizontal movement such as to obviate the need to employ a pair of individually locatable rail cars to transfer load support from the second ground conveyance system to the gantry conveyance system.

The term "ground material" means any natural, man-made or partially natural and partially made material which constitutes the ground or part of the ground at first ground locations, second ground support locations and/or third support ground location and may include coarse particulate material as well as material formed into platforms or structures of any type so as to ultimately provide sufficient load support for rails, railway ties, rail cars etc. as well as an operational gantry installation. Typically ground material comprises a layer of coarse aggregate sitting on a layer(s) of substrate(s), however it will be appreciated that a wide variety of rails, railroad tie materials and structures are known, and that rails be may supported on structures that do not employ railroad ties for support. Hence, the term ground material encompasses a wide variety of materials. Ground material may support the ends of unitary or multi-segment tie beam overhanging the sides on an adjacent bridge span.

The term "ground level" means a vertical position which approximately corresponds to a level at or above the height of a bridge pier or the surface of a bridge span, optionally at a surface height of "ground material" or the height of a support bed of a vehicle travelling on the bridge, optionally at a height approximating the height of vehicular travel on the ground across the bridge.

The phrase "overhang ground-support system" means a system for providing ground support from locations (e.g. aerial locations) adjacent to areas in which there is "actual" ground support material or a ground support means, for example in load bearing ground-support structure that is specially installed, for example a beam, optionally a tie beam.

The term "outrigger" is used to mean that the leg portion is distanced from the gantry. Hence, the "outrigger portion" of gantry connection portion serves to distance the leg portion from the gantry.

The term "track level" means a vertical position approximately corresponding to the height of a train track, optionally a height approximately corresponding to a horizontal plane of travel on a track rail or a height of a surface which supports a track rail.

The term "surface configuration", used with reference describing the gantry assembly, means that the gantry assembly, optionally the gantry per se (which is optionally flat), has an exterior surface which is sized and shaped to be supported, preferably in a horizontal position, by a shape-compatible support surface/means of a pre-installation conveyance system, compatibility in this respect being broadly defined such that any accessories or adjunct means of accomplishing the support (shims, wedges, rigging, adapter elements) whether commonly used or specially designed, do not preclude compatibility. Support portions of a pre-installation may be in the form of a bolster and may be of a stationary, sliding or otherwise friction-reduced type to accommodate a gantry of suitable length for replacement of the bridge span in question The term "gantry assembly installation" as used herein, for example with reference to describing a bridge-span replacement installation, includes at least a horizontally oriented gantry 100 (see FIG. 1A) supported proximal to each end thereof by a vertical support system adapted to be operatively associated with a lift system including ground engaging load-bearing legs 20 which are positioned on the ground at load-bearing first ground-support locations located in the vicinity of the bridge span support surfaces of two piers intended to be longitudinally spanned by the existing bridge span 6. Depending on the circumstances, the optimal installation may dictate that the ground engaging portions of the leg portions 20 are secured to tie beams 9 positioned at the first ground-support locations.

The term "full gantry support" refers to a stage of removing an existing bridge span or installing a replacement bridge span in which the entire weight of the bridge span is borne by the gantry conveyance system.

The term "horizontal transport plane" refers to a vertically-elevated (relative to the support bed of a ground conveyance system) plane of conveyance executed by the gantry conveyance system prior to partial or full load transfer to the ground conveyance system and by both systems in tandem. As far as the gantry conveyance system is concerned, the horizontal limits of this plane of transport are absolutely defined (in terms of theoretical maxima—in practice the vehicles may not be able to reach these theoretical maxima) by vehicle position limits imposed by the track length of the gantry conveyance system 10. These limits are extendable by a ground conveyance system.

Small vertical adjustments in the horizontal transport plane may be required for load transfer. In practice, though other forms of load transfer or vertical adjustment are possible (e.g. the height of the support bed of the ground conveyance system or partial release of the straps may serve this purpose) using the lift system to slightly raise or lower the bridge span within this principal transport plane may be the easiest way to transfer part of the load to or from a ground engaging conveyance system.

The term "spreader structure" refers to an elongate load-bearing support member on the gantry conveyance system e.g. vehicle oriented transversely with respect to the longitudinal axis of the gantry, optionally in the form of a steel beam that laterally distances points of attachment of a bridge span connection system from the centre of gravity of the vehicle e.g. shackles supporting loops of strap-like material.

The term "track" or "track system" is used to describe any travel path (or system exploiting same) which potentially or actually interfaces or interacts with a vehicle (as broadly defined), for example in the sense of defining a course (e.g. via a guard rail or guide member) which path may or not be an unchangeable path, and may or may not have a hold on the vehicle. Preferably, the travel path imposes some restraint or condition on the travel path (for example linearity) of a vehicle, serving, for example, as a stabilizing or security means, for example via any path defining means such an edge, rail, ridge, lip, rib, shoulder, channel etc. of any kind known to those skilled in the art. Such a path defining means may optionally fall into the category of being principally male or female and may be both in some aspect and may be also consist of or comprise spaced elements which are aligned in some fashion to collectively define or interact with mating or corresponding portions of a vehicle in a manner defining a travel path.

The term "vehicle" is used broadly to describe a movable load bearing conveyance device.

The term "vertical support and lift system" means a vertical support system that is operatively associated with a lift system.

General System Design Parameters

A two sided gantry that provides a clearance way for members of a suspension system e.g. steel cables i.e. between the two sides of the gantry, can be adapted to accommodate railway clearances (10-13 feet wide) and adapted for using a gantry conveyance system consisting of one vehicle and a central single point type suspension system (e.g. a conveyable strand jack) or a two point suspension system (e.g. employing winches). The gantry may be constructed with conventional structural members including plate girders, box beams and trusses of suitable sizes and weight bearing capacities according to design parameters well known to those skilled in the art.

A suspension system may employ well known underslung crane design systems and related track system supported beneath the gantry of type applicable to heavy duty lift systems used in overhead horizontal conveyance systems, for example in which the trolley wheels ride on the flanges of a box beam or H beam type support structure.

With respect to parameters for designing a gantry assembly as described in detail herein, it will be appreciated: the outrigger and leg portions of the vertical support assemblies may be positioned at respective horizontal distances A and B from an end of the gantry; the positions along an existing bridge span to which the straps of the bridge span connection system are connected are located at horizontal distances C and D from the end of the existing bridge span; the gantry conveyance system may comprise a track system and a forward vehicle and rearward vehicle, and the ground conveyance system may comprise a forward rail car having a bridge span support surface and a rearward rail car having a bridge span support surface; the forward vehicle rides and along the track system during conveyance of the bridge span in the horizontal transport plane with a portion of the bridge span connection system vertically suspended above the vertical height and within the lateral span of the outrigger portion, the position of the outrigger portion inhibiting conveyance of the bridge span connection system past the position of outrigger portion such that a longitudinal position of the outrigger portion relative to an end of the gantry effectively defines a forward vehicle position limit; the length of gantry relative to length of the bridge span and the distances A, B, C and D accommodate alignment of a forward end of the bridge span with second ground locations corresponding to a support surface a forward rail car and alignment of a rearward end of the bridge span with second ground locations corresponding to a support surface of the rearward rail car.

In terms of replacing an existing bridge span, the outrigger and leg portions of the vertical support assemblies are positioned at respective horizontal distances A and B from an end of the gantry; the positions along the bridge span to which straps of the bridge span connection system are connected are located at horizontal distances C and D from the end of the bridge span; the gantry conveyance system comprises a track system and a forward vehicle and rearward vehicle (capable of moving both forwardly and rearwardly); the second ground conveyance system comprises a forward rail car having a bridge span support surface and a rearward rail car having a bridge span support surface; the track system defines a rearward vehicle position limit and the rearward vehicle defines a forward vehicle position limit at a rearward end of the track system; the forward vehicle and rearward vehicle ride along the track system during conveyance of the bridge span in the horizontal transport plane optionally with a portion of the bridge span connection system vertically suspended above the vertical height of the outrigger portion and within the lateral span of the outrigger portion, the position of the outrigger portion inhibiting positioning of the bridge span connection system past the position of outrigger portion when the bridge span connection system is connected to the bridge span; the length of gantry relative to length of the bridge span, the length of the forward vehicle, the length of the rearward vehicle, the length of the forward rail car, the length of rearward rail car, and the distances A, B, C and D accommodate alignment of a forward end of the bridge span with a strap position limit of forward vehicle and alignment of a rearward end of the bridge span with a strap position limit of the rearward vehicle.

In terms of the pre-installation conveyance system, the support portion is a support platform having a platform footprint area including lateral perimeters; the gantry assembly defines a gantry assembly footprint area including lateral perimeters; lateral clearance is affected by the curvature of the train track; the track system is affixed on top the gantry; the height of gantry assembly on the pre-installation conveyance system and the lateral perimeters of platform footprint area and gantry assembly footprint area define a conveyance envelope that accommodates existing railway clearances for delivery of the gantry assembly to or from a site of removal and/or placement of a bridge span (e.g. approximately 18 feet); optionally the gantry has a substantially flat surface configuration adapted to be supported on the support platform reducing the vertical size of the conveyance envelope, optionally the at least one vehicle rides on top of the track system during delivery and/or removal of the gantry assembly increasing the vertical size of the conveyance envelope.

In terms of the outrigger portion, the outrigger portion is preferably configured to laterally distance the leg portions of the first vertical support assembly and the second vertical support assembly from lateral perimeters of the gantry, by a distance which accommodates passage of a bridge span having up to a 13 foot wide footprint between the leg portions of the first vertical support assembly and the second vertical support assembly.

Example

A gantry may be approximately 150 feet in length). Railway clearances depending on the location may be approximately 14 feet wide and the lateral dimension of the gantry assembly with the outrigger portion and gantry legs positioned in a stowed position may be approximately 11-11.5 feet and may be carried on a rail car having a conventional support deck of approximately 10 feet in width. A bridge span transported to a gantry assembly installation may have a lateral footprint which may be approximately a foot shorter than the maximum lateral railway clearance. When the outrigger and leg portions of the vertical support assemblies are in an installation position they may provide a 9 inch plus clearance on either side the bridge span, or a total clearance of approximately 14 to 15 feet (e.g. 14.5 feet), the centers of gantry legs laterally spanning approximately 15 to 16 feet (e.g. 15.5 feet) and supported on support beams (alternatively termed tie beams) of approximately 16 feet in length. The gantry may have a narrower footprint than the pre-installation conveyance system (and the spreader beam on top of vehicles of the gantry conveyance system may be a lateral length sufficient to allow the straps to hang vertically and freely about the gantry when connected to the bridge span (e.g. approximately 7 feet).

Strictly by way of example, a bridge span of approximately 125-150 tons and 90-110 feet in length may be supported by a gantry of 140-160 feet in length supported by four hydraulically powered leg portions operating to lift a combined weight lift of approximately 300 tons (combined weight of bridge span, gantry and gantry conveyance system).

According to one aspect the invention is directed to use of a gantry installation in which the bridge span is suspended in the horizontal transport plane under safe wind conditions e.g. in which the wind speed is preferably less than 30 km/hour.

It will be appreciated that each embodiment of the invention(s) described herein has application to the various aspects of the invention including method, system, gantry assembly installation and gantry assembly. Therefore, save for method steps involving a particular action, each embodiment shall be considered to have general application to each aspect of the invention and each other embodiment. Method steps shall have application to the use of a gantry assembly installation, gantry assembly and system as variously defined herein for removing an existing bridge span or installing a replacement bridge span in its place, or both e.g. to a use in accordance with any embodiment of the method.

While the above description constitutes a plurality of embodiments of the present invention, it will be appreciated that the present invention is susceptible to further modification and change without departing from the fair meaning of the accompanying claims.

We claim:

1. A system for replacing a bridge span with a replacement bridge span, the bridge span supported across piers of a train bridge that support a section of track overlying the bridge span, the section of track connecting portions of a railroad track adjacent to the section of track, the system comprising:
    a gantry assembly comprising a gantry and leg portions located at opposite ends and opposite sides of the gantry for supporting the gantry on load-bearing surfaces at locations located off both ends of the bridge span, the distance between the leg portions on opposite sides of the gantry accommodating horizontal conveyance of the bridge span through the leg portions when installed onto the load-bearing surfaces; and
    a gantry conveyance system including separately locatable vehicles releasably connectable to the bridge span, wherein the separately locatable vehicles are operable to suspend the bridge span beneath the separately locatable vehicles and convey a forward end and a rearward end of the bridge span horizontally along the gantry towards and away from a ground conveyance system,
    the ground conveyance system including at least one rail car located on a portion of the railroad track off the bridge span, the ground conveyance system having support surfaces for supporting the forward end and the rearward end of the bridge span;
    a lift system operable for lifting and lowering the bridge span relative to the piers and the ground conveyance system,
        wherein the gantry supports the separately locatable vehicles for horizontal movement over a distance predetermined to convey the forward end and the rearward end of the bridge span respectively into positions overlying the at least one rail car of the ground conveyance system such that the forward end and rearward end of the bridge span can be conveyed in stages between the gantry conveyance system and the ground conveyance system,
        wherein the leg portions support the gantry at a height from which the lift system is operable to lift the bridge span from the piers into at least one horizontal transport plane, the at least one horizontal transport plane predetermined to accommodate conveyance of the bridge span through the leg portions at a height above the support surfaces of the ground conveyance system from which the lift system can lower the bridge span onto the ground conveyance system.

2. A system as claimed in claim 1, further comprising a pre-installation conveyance system for supporting the gantry assembly for travel along the railroad track to the train bridge in a horizontal orientation into horizontal alignment with a selected location for the the load-bearing surfaces such that the leg portions can be installed directly from the pre-installation conveyance system onto the load-bearing surfaces.

3. A system as claimed in claim 2, wherein the leg portions include ground engaging portions that are positionable to be supported on the load-bearing surfaces including surfaces of a load-bearing structure located off both ends of the bridge span.

4. A system as claimed in claim 2, wherein the gantry assembly is transportable in a stowed position on the pre-installation conveyance system wherein the leg portions fit within a conveyance system envelope that is predetermined to fit within lateral clearance specifications on both sides of the railroad track for a route of travel on the railroad track to the train bridge.

5. A system as claimed in claim 4, where the leg portions are extendable into an installation position on the pre-installation conveyance system such that the leg portions define a post-installation gantry assembly footprint that extends outside at least one of the lateral clearance specifications, such that a bridge span that is laterally wider than the conveyance system envelope can be arranged to pass between the leg portions at one end of the gantry assembly when the leg portions, in the installation position, are installed from the pre-installation conveyance system onto the load-bearing surfaces.

6. A system as claimed in claim 5, wherein the leg portions are laterally extendable from the stowed position into the installation position by rotating the leg portions and fixing the position of the leg portions relative to the gantry.

7. A system as claimed in claim 5, wherein the pre-installation conveyance system comprises a forward rail car which supports a forward end portion of the gantry assembly and a rearward rail car which supports a rearward end of the gantry assembly, and wherein the conveyance system envelope is approximately 10 ft. wide and 130 ft. long, the conveyance system envelope predetermined to fit within the lateral clearance specifications and a vertical clearance specification for the route of travel to the train bridge.

8. A system as claimed in claim 1, wherein the ground conveyance system includes a forward rail car for supporting the forward end of the bridge span and a rearward rail car for supporting the rearward end of the bridge span, at least one of the forward rail car and the rearward rail car located on a portion of the railroad track that is adjacent to the section of track when the bridge span is scheduled to be conveyed in stages between the gantry conveyance system and the ground conveyance system and wherein the separately locatable vehicles comprise independently locatable forward and rearward vehicles wherein the length of the gantry accommodates horizontal travel of a forward vehicle into a position in which the forward end of the bridge span is overlying the forward rail car and travel of a rearward vehicle into a position in which the the rearward end of the bridge span is overlying the rearward rail car such that the forward end of the bridge span can be conveyed and lowered onto the forward rail car first and such that the rearward end of bridge span can be conveyed and lowered onto the rearward rail car after the forward rail car and rearward vehicle are conveyed in a forward direction into the position in which the rearward end of the bridge span overlies the rearward rail car.

9. A system as claimed in claim 8, wherein the forward vehicle and rearward vehicle are operatively associated with a winch or strand jack such that the lift system is operable to lift and lower respective forward and rearward ends of the bridge span into and from the at least one horizontal transport plane.

10. A system as claimed in claim 2, wherein the leg portions include telescopable segments wherein the lift system is operable to shorten and lengthen the leg portions, the leg portions vertically extendable to lower the leg portion from the pre-installation conveyance system onto the load-bearing surfaces and increase the height of the gantry to define the at least one horizontal transport plane.

11. A system as claimed in claim 6, wherein the leg portions are each respectively connected to the gantry via an outrigger portion, that is rotatable with the leg portions relative to the gantry between the stowed position and the installation position.

12. A bridge span handling system for at least one of placement and removal of a train bridge-span of the type which spans and is supported by two piers, comprising:
a gantry assembly comprising a gantry, a plurality of leg portions that are positionable at first ground support locations to support the gantry assembly thereon, and a lift system for at least one of raising and lowering the train bridge span relative to the piers,
wherein the gantry assembly is adapted to be transported in a horizontal position by a pre-installation conveyance system to a site for said at least one of placement and removal of the train bridge span, the pre-installation conveyance system including at least one rail car, wherein the gantry assembly has a stowed position in which the gantry assembly has a stowed gantry assembly footprint having lateral perimeters that are spaced laterally from one another by a first distance, and an installation position in which the leg portions at least at a first end of the gantry assembly are positioned laterally outboard relative to the leg portions at least at the first end of the gantry assembly, when the gantry assembly is in the stowed position, so as to permit a train bridge span laterally wider than the first distance to be conveyed between the leg portions at least at the first end of the gantry assembly,
wherein the gantry assembly is adapted to support a gantry conveyance system, the gantry conveyance system adapted to cooperate with a ground conveyance system that includes at least one car, the gantry conveyance system positionable on the gantry for at least one of: transferring the train bridge span between the leg portions at least at the first end of the gantry assembly from the gantry assembly onto the at least one car for transport away from the gantry assembly, and transferring the train bridge span between the leg portions at least at the first end of the gantry assembly to the gantry assembly from the at least one car.

13. A system as claimed in claim 12, wherein each of the leg portions at least at the first end of the gantry assembly are pivotably connected to the gantry for pivotal movement about a respective vertical axis from a respective first leg portion position defining the stowed gantry assembly footprint to a second leg portion position, defining an extended gantry assembly footprint, wherein the leg portions at least at the first end of the gantry assembly are spaced laterally farther apart in the extended gantry assembly footprint relative to the stowed gantry assembly footprint.

14. A system as claimed in claim 12, wherein in the stowed position the leg portions fit within a conveyance system envelope that is predetermined to fit within lateral clearances on both sides of a railroad track on a route of travel to the train bridge, and wherein in the installation position the leg portions at least at the first end of the gantry assembly are positioned outside of the lateral clearances to an extent that accommodates conveyance of the bridge span by the gantry conveyance system between the leg portions.

15. A system as claimed in claim 12, wherein the leg portions are laterally extendable from the stowed position into the installation position by rotating the leg portions and fixing the position of the leg portions relative to the gantry.

16. A system as claimed in claim 12, wherein the ground conveyance system includes at least one rail car, the at least one rail car located on a portion of the railroad track that is off the bridge span and wherein the gantry conveyance system comprises separately locatable vehicles releasably connectable to the bridge span, wherein the separately locatable vehicles are operable to suspend the bridge span and convey a forward end and a rearward end of the bridge span horizontally along the gantry towards and away from the ground conveyance system, the gantry supporting the separately locatable vehicles for horizontal movement in at least one horizontal transport plane over a distance predetermined to:
a) convey the forward end and the rearward end of the bridge span respectively into positions overlying the at least one rail car of the ground conveyance system when removing the bridge span; and
b) convey the forward end and the rearward end of the bridge span into positions underlying the separately locatable vehicles when installing a replacement bridge span; such that the forward end and rearward end of the bridge span can be conveyed in stages between the gantry conveyance system and the ground conveyance system.

17. A system as claimed in claim 16, wherein the ground conveyance system comprises a forward rail car for supporting the forward end of the bridge span and a rearward rail car for supporting the rearward end of the bridge span and wherein the gantry conveyance system comprises independently locatable forward and rearward vehicles wherein the length of the gantry accommodates horizontal travel of a forward vehicle into a position in which the forward end of the bridge span, suspended from the forward vehicle, overlies the forward rail car and travel of a rearward vehicle into a position in which the rearward end of bridge, suspended from the rearward vehicle, overlies the rearward rail car such that when removing the bridge span the forward end of the bridge span can be conveyed and lowered onto the forward rail car first and the rearward end of bridge span can be conveyed and lowered onto the rearward rail car after the forward rail car and rearward vehicle are conveyed in a forward direction into the position in which the rearward end of the bridge span overlies the rearward rail car.

18. A system as claimed in claim 16, wherein the ground conveyance system comprises a forward rail car for supporting the forward end of the bridge span and a rearward rail car for supporting the rearward end of the bridge span and wherein the gantry conveyance system comprises independently locatable forward and rearward vehicles wherein the length of the gantry accommodates horizontal travel of a forward vehicle into a position in which the forward vehicle overlies the forward end of the bridge span when supported by the forward rail car and travel of a rearward vehicle into a position in which the rearward end of the bridge span, supported on the rearward rail car, lies under the rearward vehicle such that when replacing the bridge span the forward end of the bridge span can be raised by the forward vehicle first and the rearward end of bridge span can be raised by the rearward vehicle after the rearward rail car is conveyed in a forward direction into the position in which the rearward end of the bridge span lies under the rearward vehicle.

19. A system as claimed in claim 18, wherein the forward vehicle and rearward vehicle are operatively associated with a winch or strand jack such that the lift system is operable to lift and lower respective forward and rearward ends of the bridge span into and from the at least one horizontal transport plane.

20. A system as claimed in any of claim 18, wherein the leg portions include telescopable segments arranged to be shortened and lengthened by the lift system, the leg portions operable to be vertically extendable to transfer the leg portions from the pre-installation conveyance system onto load-bearing surfaces at selected ground support locations and increase the height of the gantry to define the at least one horizontal transport plane.

21. A method for removing a bridge-span from a train bridge, the bridge span of the type supported across two piers of the train bridge and supporting a section of track overlying the bridge span, the section of track connecting portions of railroad track adjacent to the section of track, the method comprising:
a) transporting a gantry assembly in a stowed position along the railroad track on a pre-installation conveyance system into an installation position overlying the bridge span, the gantry assembly supporting a gantry conveyance system, the gantry assembly comprising a gantry, a plurality of leg portions, and a lift system;
b) extending the gantry assembly from the stowed position to an installation position in which the leg portions are moved laterally outward relative to when the gantry assembly is in the stowed position, and supporting the gantry assembly via engagement of the leg portions with a plurality of load bearing surfaces at predetermined ground support locations;
c) positioning at least one ground conveyance vehicle to be adjacent the bridge span;
d) after step b), lifting the bridge span to a raised position using the lift system;
e) after steps c) and d), transporting the bridge span along the gantry and transferring the bridge span from the gantry assembly onto the at least one ground conveyance vehicle, using the gantry conveyance system; and
f) after step e), transporting the bridge span away from the gantry assembly on the at least one ground conveyance vehicle.

22. A method as claimed in claim 21, wherein in the stowed position the leg portions fit within a footprint having lateral perimeters predetermined to fit within lateral clearances on both sides of the railroad track on a route of travel to the train bridge, and wherein in the installation position the leg portions, at least at one end of the gantry assembly, are extended outboard of the lateral perimeters and lateral clearances to an extent that accommodates conveyance of the bridge span by the gantry conveyance system between the leg portions.

23. A method as claimed in claim 21, wherein the at least one ground conveyance vehicle is at least one rail car.

24. A method as claimed in claim 21, wherein in the installation position the leg portions, at both ends of the gantry assembly, are extended outboard of the lateral perimeters and lateral clearances to an extent that accommodates conveyance of the bridge span by the gantry conveyance system between the leg portions.

25. A method as claimed in claim 22, wherein each of the leg portions at least at the one end of the gantry assembly are pivotably connected to the gantry for pivotal movement about a respective vertical axis from a respective first leg portion position that fits within a stowed gantry assembly footprint to a second leg portion position, defining an extended gantry assembly.

26. A method as claimed in claim 22, wherein the ground conveyance system includes forward and rearward rail cars that are located on a portion of the railroad track that is off the bridge span and wherein gantry conveyance system comprises separately locatable vehicles releasably connectable to the bridge span, wherein the separately locatable vehicles are operable to suspend the bridge span beneath the separately locatable vehicles and convey a forward end and a rearward end of the bridge span horizontally along the gantry towards and away from the ground conveyance system, the gantry supporting the separately locatable vehicles for horizontal movement in at least one horizontal transport plane over a distance predetermined to convey the forward end and the rearward end of the bridge span respectively into positions overlying the forward and rearward rail cars of the ground conveyance system such that the forward end and rearward end of the bridge span can be conveyed in stages between the gantry conveyance system and the ground conveyance system.

27. A method as claimed in claim 21, wherein the ground conveyance system comprises a forward rail car for supporting the forward end of the bridge span and a rearward rail car for supporting the rearward end of the bridge span and wherein the gantry conveyance system comprises independently locatable forward and rearward vehicles and wherein the length of the gantry accommodates horizontal travel of a forward vehicle into a position in which the forward end of the bridge span suspended from the forward vehicle overlies the forward rail car and travel of a rearward vehicle into a position in which the rearward end of the bridge span suspended from the rearward vehicle overlies the rearward rail car such that the forward end of the bridge span can be conveyed and lowered onto the forward rail car first and the rearward end of bridge span can then be conveyed and lowered onto the rearward rail car after the forward rail car and rearward vehicle are conveyed in a forward direction into the position in which the rearward end of the bridge span overlies the rearward rail car.

28. A method as claimed in claim 21, wherein the forward vehicle and rearward vehicle are operatively associated with a winch or strand jack such that the lift system is operable to lift and lower respective forward and rearward ends of the bridge span into and from the at least one horizontal transport plane.

29. A method as claimed in claim 21, wherein the leg portions include telescopable segments arranged to be shortened and lengthened by the lift system, the leg portions operable to be vertically extendable from the stowed position to transfer the leg portion from the pre-installation conveyance system onto load-bearing surfaces at predetermined ground support locations and increase the height of the gantry to define at least one horizontal transport plane.

30. A method for installing a bridge-span on a train bridge, the bridge span of the type supported across two piers of the train bridge and supporting a section of track overlying the bridge span, the section of track connecting portions of railroad track adjacent to the section of track, the method comprising:
 a) transporting a gantry assembly in a stowed position along the railroad track on a pre-installation conveyance system into an installation position overlying an installation location for the bridge span, the gantry assembly supporting a gantry conveyance system, the gantry assembly comprising a gantry, a plurality of leg portions and a lift system;
 b) extending the gantry assembly from the stowed position to an installation position in which the leg portions are moved laterally outward relative to when the gantry assembly is in the stowed position, and supporting the gantry assembly via engagement of the leg portions with a plurality of load bearing surfaces at predetermined ground support locations;
 c) transporting the bridge span to the gantry assembly on at least one ground conveyance vehicle;
 d) positioning the bridge span on the at least one ground conveyance vehicle, to be adjacent the installation location for the bridge span;
 e) after step d), transferring the bridge span from the at least one ground conveyance vehicle onto the gantry assembly using the gantry conveyance system;
 f) after step e), transporting the bridge span along the gantry to overly the installation location for the bridge span using the gantry conveyance system; and
 g) after step f), lowering the bridge span from a raised position into the installation location for the bridge span using the lift system.

31. A method as claimed in claim 30, wherein in the stowed position the leg portions fit within a footprint having lateral perimeters that are predetermined to fit within lateral clearances on both sides of the railroad track on a route of travel to the train bridge, and wherein in the installation position the leg portions, at least at one end of the gantry assembly, are extended outboard of the lateral perimeters and lateral clearances to an extent that accommodates conveyance of the bridge span by the gantry conveyance system between the leg portions.

32. A method as claimed in claim 30, wherein the at least one ground conveyance vehicle is at least one rail car.

33. A method as claimed in claim 32, wherein in the installation position the leg portions, at both ends of the gantry assembly, are extended outboard of the lateral perimeters and lateral clearances to an extent that accommodates conveyance of the bridge span by the gantry conveyance system between the leg portions.

34. A method as claimed in claim 30, wherein the ground conveyance system comprises a forward rail car for supporting the forward end of the bridge span and a rearward rail car for supporting the rearward end of the bridge span and wherein the gantry conveyance system comprises independently locatable forward and rearward vehicles wherein the length of the gantry accommodates horizontal travel of a forward vehicle into a position in which the forward vehicle overlies the forward end of the bridge span supported by the forward rail car and travel of a rearward vehicle into a position in which the rearward end of the bridge span, supported on the rearward rail car, lies under the rearward vehicle such that when replacing the bridge span the forward end of the bridge span can be raised by the forward vehicle first and the rearward end of bridge span can be raised by the rearward vehicle after the rearward rail car is conveyed in a forward direction into the position in which the rearward end of the bridge span lies under the rearward vehicle.

* * * * *